United States Patent
Park et al.

(10) Patent No.: US 11,860,445 B2
(45) Date of Patent: Jan. 2, 2024

(54) ACTUATOR FOR DRIVING REFLECTOR

(71) Applicant: JAHWA ELECTRONICS CO., LTD., Cheongju-si (KR)

(72) Inventors: Chul Soon Park, Cheongju-si (KR); In Soo Kang, Cheongju-si (KR); Je Seung Yeon, Cheongju-si (KR); Soo Young Yoon, Cheongju-si (KR); Jaeseon Lee, Cheongju-si (KR); Hyeonik Cho, Daegu (KR)

(73) Assignee: JAHWA ELECTRONICS CO., LTD., Cheongju-si (KR)

( * ) Notice: Subject to any disclaimer, the term of this patent is extended or adjusted under 35 U.S.C. 154(b) by 310 days.

(21) Appl. No.: 17/195,735

(22) Filed: Mar. 9, 2021

(65) Prior Publication Data

US 2022/0091365 A1 Mar. 24, 2022

(30) Foreign Application Priority Data

Sep. 22, 2020 (KR) .................. 10-2020-0122379
Sep. 29, 2020 (KR) .................. 10-2020-0126617

(51) Int. Cl.
*G02B 7/182* (2021.01)
*G02B 7/18* (2021.01)

(52) U.S. Cl.
CPC ......... *G02B 7/1821* (2013.01); *G02B 7/1805* (2013.01)

(58) Field of Classification Search
CPC ........ G02B 7/18; G02B 7/1805; G02B 7/182; G02B 7/1821
USPC .......................................................... 359/872
See application file for complete search history.

(56) References Cited

U.S. PATENT DOCUMENTS

| | | | | |
|---|---|---|---|---|
| 10,261,337 B2 * | 4/2019 | Yeon | ...................... | H02P 6/006 |
| 10,564,442 B2 * | 2/2020 | Seol | ..................... | G02B 27/646 |
| 10,866,430 B2 * | 12/2020 | Kim | ...................... | G03B 17/17 |
| 11,029,374 B2 * | 6/2021 | Park | ...................... | G01R 33/072 |
| 11,543,675 B2 * | 1/2023 | Park | ...................... | G03B 5/00 |
| 2015/0296112 A1 | 10/2015 | Park et al. | | |
| 2018/0239161 A1 * | 8/2018 | Seol | ..................... | G02B 27/646 |
| 2019/0049687 A1 * | 2/2019 | Bachar | ................... | H04N 23/69 |

(Continued)

FOREIGN PATENT DOCUMENTS

| KR | 20110040740 A | 4/2011 |
|---|---|---|
| KR | 20180003539 A | 1/2018 |

(Continued)

*Primary Examiner* — Ricky D Shafer
(74) *Attorney, Agent, or Firm* — Bayramoglu Law Offices LLC

(57) ABSTRACT

An actuator for driving a reflector includes a movement frame, a first support frame, a first drive coil, a first rotation guide and a first ball. The movement frame includes a reflector configured to reflect or refract light to a lens and a first magnet. The first support frame is configured to provide a space of the movement frame to move. The first drive coil is configured to generate an electromagnetic force in the first magnet to rotationally move the movement frame in a first direction based on the first support frame. The first rotation guide is arranged between the movement frame and the first support frame and has an arc shape so that the movement frame rotates in the first direction. The first ball is arranged inside the first rotation guide, wherein a center of curvature of the first rotation guide corresponds to a center of rotation of the reflector.

18 Claims, 20 Drawing Sheets

(56) References Cited

U.S. PATENT DOCUMENTS

| | | | |
|---|---|---|---|
| 2019/0129197 A1* | 5/2019 | Kim | G02B 27/646 |
| 2020/0400464 A1 | 12/2020 | Yedid et al. | |
| 2021/0199983 A1* | 7/2021 | Kazuo | G02B 13/0065 |
| 2021/0286193 A1* | 9/2021 | Kwon | G02B 26/085 |
| 2022/0229310 A1* | 7/2022 | Park | G02B 7/102 |
| 2022/0272238 A1* | 8/2022 | Jang | H04N 23/57 |
| 2022/0390707 A1* | 12/2022 | Park | G02B 13/009 |

FOREIGN PATENT DOCUMENTS

| | | |
|---|---|---|
| KR | 20180012150 A | 2/2018 |
| KR | 20180037877 A | 4/2018 |
| KR | 20180096073 A | 8/2018 |
| KR | 101942743 B1 | 1/2019 |
| KR | 102002718 B1 | 10/2019 |
| KR | 20190134144 A | 12/2019 |
| KR | 20200001243 A | 1/2020 |

* cited by examiner (a)

(b)

(a)

(b)

(a)

(b)

ACTUATOR FOR DRIVING REFLECTOR

CROSS-REFERENCE TO THE RELATED APPLICATIONS

This application is based upon and claims priority to Korean Patent Application No. 10-2020-0122379, filed on Sep. 22, 2020 with DAS code: 3FA4, and Korean Patent Application No. 10-2020-0126617, filed on Sep. 29, 2020 with DAS code: F33B, the entire contents of which are incorporated herein by reference.

TECHNICAL FIELD

The present invention relates to an actuator for driving a reflector, and more specifically, to an actuator for driving a reflector that implements Optical Image Stabilization (OIS) or the like through the improvement of a ball guide structure.

BACKGROUND

As a hardware technology for image processing advances and a user need for image capture or the like increases, functions such as Auto Focus (AF), Optical Image Stabilization (OIS), and the like are implemented on camera modules or the like mounted on mobile terminals such as mobile phones or smartphones, as well as independent camera devices.

The AF (auto focus control) function refers to a function of linearly moving a carrier having a lens or the like in a direction of an optical axis to adjust a focal length from a subject so that a clear image is generated by an image sensor (CMOS, CCD, or the like) provided at a rear end of the lens.

In addition, the OIS function refers to a function of, when shaking of the lens occurs due to hand shaking, improving image clarity by adaptively moving a carrier (frame) on which a lens is mounted in a direction that compensates for the shaking.

As one of representative methods of implementing the AF or OIS function, there is a method of installing a magnet (coil) in a moving body (carrier) and a coil (magnet) in a fixed body (housing, another type of a carrier, or the like) and then generating an electromagnetic force between the coil and magnet to move the moving body in the direction of the optical axis or a direction perpendicular to the optical axis.

Meanwhile, recently, a zoom lens, which has specifications capable of variably adjusting a focal distance or capturing a distant image in order to meet higher user needs and to implement user convenience or the like in a more diverse manner, is mounted on a mobile terminal.

The zoom lens has a structure in which a plurality of lenses or lens groups are arranged side by side or has a characteristic that a length of the lens itself is long based on the direction of the optical axis, and thus a larger mounting space should be provided in the mobile terminal.

Recently, in order to organically combine physical characteristics of the zoom lens with geometric characteristics of the mobile terminal, an actuator or a camera module having a physical structure to refract light of a subject using a reflector disposed on a front end of the lens has been disclosed.

The actuator adopting the reflector or the like does not correct and move the lens according to the hand shaking but implements the OIS with respect to the hand shaking by moving the reflector that reflects the light of the subject in a lens direction in one or two axes.

Typically, the actuator has a structure in which a guide rail is formed in each of the moving body (a physical object having the reflector) and the fixed body, a plurality of balls are arranged therebetween, and thus the moving body rotationally moves along the guide rail while being supported by the balls.

However, in the actuator of the related art, a center of curvature of the guide rail and a center of rotation of the reflector do not coincide with each other. Accordingly, even if the same driving force is applied to the magnet, an amount of rotation of the moving body is different depending on a position of the moving body, and thus there is a problem in that a separate compensation algorithm should be applied to compensate for the amount of rotation for each position.

SUMMARY

The present invention is directed to design in which a center of curvature of a rotation guide and a center of rotation of a reflector coincide with each other and an amount of rotation of a moving body is the same for the same driving force regardless of a position of the moving body.

Other objects and advantages of the present invention can be understood by the following description and will be more clearly understood by embodiments of the present invention. In addition, the objects and advantages of the present invention can be realized by configurations described in claims and a combination of the configurations.

According to an aspect of the present invention, there is provided an actuator for driving a reflector including a movement frame including a reflector configured to reflect or refract light to a lens and a first magnet, a first support frame configured to provide a space of the movement frame to move, a first drive coil configured to generate an electromagnetic force in the first magnet to rotationally move the movement frame in a first direction based on the first support frame, a first rotation guide between the movement frame and the first support frame and having an arc shape so that the movement frame rotates in the first direction, and a first ball inside the first rotation guide, in which a center of curvature of the first rotation guide corresponds to a center of rotation of the reflector.

The first support frame may include a second magnet.

The actuator for driving a reflector of the present invention may further include a second support frame configured to provide a space of the first support frame to move, a second drive coil configured to generate an electromagnet force in the second magnet to rotationally move the first support frame in a second direction opposite to the first direction based on the second support frame, a second rotation guide between the first support frame and the second support frame and having an arc shape so that the first support frame rotates in the second direction, and a second ball inside the second rotation guide, in which a center of curvature of the second rotation guide corresponds to the center of rotation of the reflector.

The first rotation guide may include a first guide rail provided on an inner surface of the first support frame parallel to an optical axis, and a second guide rail provided on an outer surface of the movement frame to correspond to the first guide rail.

The first rotation guide may include a third guide rail provided on the outer surface of the movement frame parallel to the optical axis, and a first holder provided on the inner surface of the first support frame to correspond to the third guide rail.

The first rotation guide may include a fourth guide rail provided on the inner surface of the first support frame parallel to the optical axis, and a second holder provided on the outer surface of the movement frame to correspond to the fourth guide rail.

The first holder may be includes a plurality of holders disposed along the arc shape.

The second rotation guide may include a fifth guide rail provided on an outer surface of the first support frame perpendicular to the optical axis, and a sixth guide rail provided on an inner surface of the second support frame to correspond to the fifth guide rail.

The second rotation guide may include a seventh guide rail provided on the outer surface of the first support frame perpendicular to the optical axis, and a third holder provided on the inner surface of the second support frame to correspond to the seventh guide rail.

The second rotation guide may include a eighth guide rail provided on the inner surface of the second support frame perpendicular to the optical axis, and a fourth holder provided on the outer surface of the first support frame to correspond to the eighth guide rail.

The third holder may be includes a plurality of holders disposed along the arc shape.

The fourth holder includes as a plurality of holders disposed along the arc shape.

The first rotation guide faces the second rotation guide based on the center of curvature.

The actuator for driving a reflector of the present invention may further include a third magnet in the first support frame and a first yoke in the movement frame to generate an attractive force in the third magnet, in which centers of the third magnet and the first yoke may corresponds to the center of curvature of the first rotation guide.

The actuator for driving a reflector of the present invention may further include a second yoke configured to generate an attractive force in the second magnet, in which centers of the second magnet and the second yoke may corresponds to the center of curvature of the second rotation guide.

The actuator for driving a reflector of the present invention may further include a first position sensor and a second position sensor disposed at an inner center of the first drive coil.

The second drive coil may include a first sub-drive coil configured to rotationally move the first support frame in the first direction, and a second sub-drive coil configured to rotationally move the first support frame in the second direction.

The actuator for driving a reflector of the present invention may further include a third position sensor and a fourth position sensor respectively disposed at inner edges of the first sub-drive coil and the second sub-drive coil and each disposed at the edge farthest from the center of curvature of the second rotation guide.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF THE EMBODIMENTS

Figure 1:
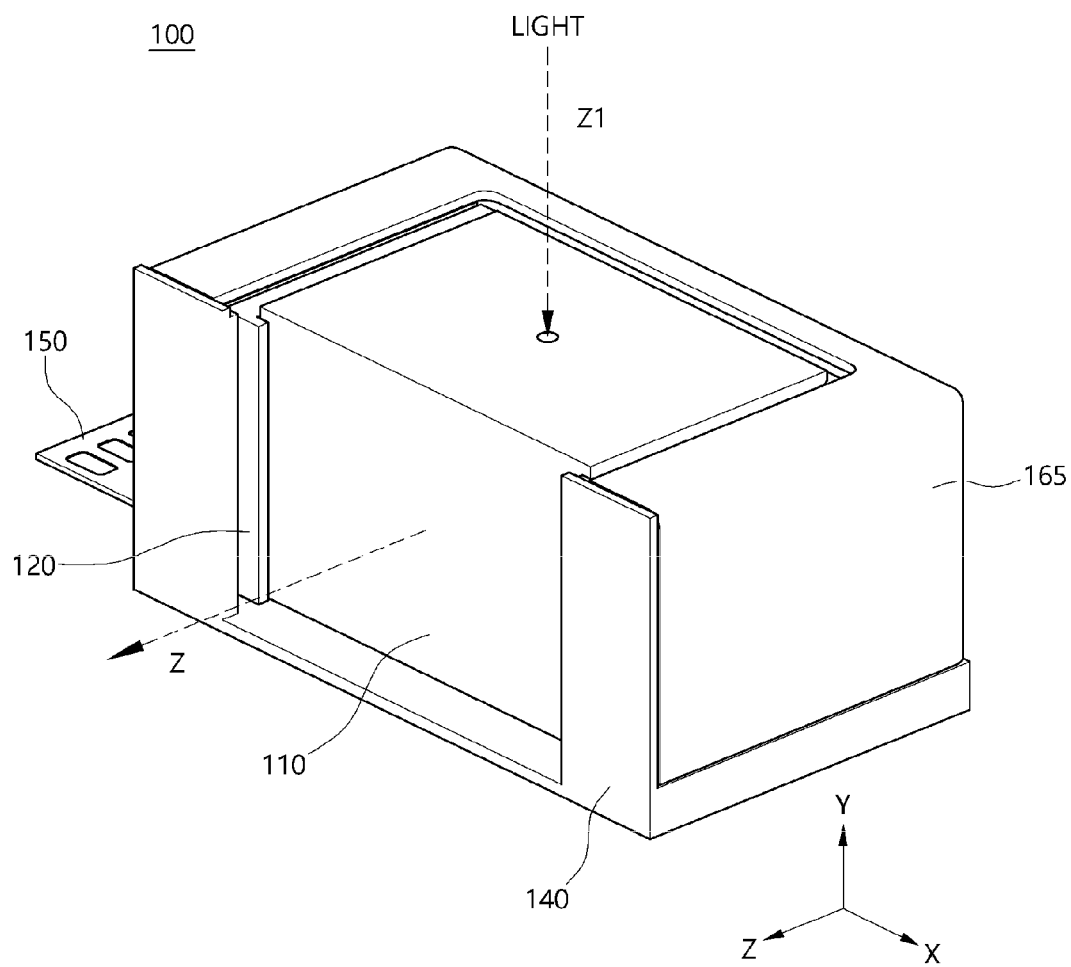
FIG. 1 is a perspective view of an overall assembly of an actuator for driving a reflector according to one embodiment of the present invention.

Hereinafter, exemplary embodiments of the present invention will be described in detail with reference to the accompanying drawings. Prior to the description, terms or words used in the present specification and claims should not be construed as being limited to their usual or dictionary meanings, and the terms or words should be interpreted as meanings and concepts consistent with a technical idea of the present invention based on a principle that the inventor can properly define concepts of the terms in order to describe his or her invention in the best way.

Accordingly, the embodiments described in the present specification and configurations illustrated in the drawings are only the most exemplary embodiments of the present invention and do not represent all technical ideas of the present invention, and thus, it should be understood that at the time of the present application, there may be various equivalents and modifications that can replace the embodiments and configurations.

FIG. 1 is a perspective view of an overall assembly of an actuator for driving a reflector according to one embodiment of the present invention.

As illustrated in FIG. 1, an actuator 100 for driving a reflector according to one embodiment of the present invention may of course be implemented as a single device and may be implemented in the form of a camera module including a lens assembly, a lens driving module that implements autofocus of the lens assembly, an image sensor, and the like. Here, when the actuator 100 for driving a reflector is implemented in the form of a camera module, the lens assembly may be located below the actuator 100 for driving a reflector.

According to the present invention, light of a subject is not directly introduced into the lens assembly and is introduced into the lens assembly after a path of light is changed (refracted, reflected, or the like) through a reflector 110 provided in the actuator 100 for driving a reflector of the present invention.

As described above, the actuator 100 for driving a reflector according to one embodiment of the present invention is configured so that the light is introduced into the lens assembly after the path of light is refracted by the reflector 110. Accordingly, since the lens assembly itself does not need to be installed in a thickness direction of a mobile terminal, even when a lens having long physical characteristics in a direction of an optical axis such as a zoom lens is mounted on the mobile terminal, a thickness of the mobile terminal does not increase, and thus it is possible to reduce a size of the mobile terminal.

As illustrated in FIG. 1, a path of light coming from the outside is a path Z1, and a path through which the light introduced from the outside is refracted or reflected by the reflector 110 and introduced into the lens assembly is a path Z. In the following description, a Z-axis direction, which is a direction in which light is introduced into the lens assembly, is referred to as an optical axis to a direction of the optical axis.

The reflector 110 may be one selected from or a combination of a mirror and a prism and, may further be implemented as one of various members capable of changing light introduced from the outside in the direction of the optical axis.

The lens assembly may be a zoom lens in which not only a single lens but also a plurality of lenses or lens groups, or an optical member such as a prism or a mirror may be included therein, and when the lens assembly is constituted by a zoom lens or a zoom lens barrel, the lens assembly may have a shape extending in the direction of the optical axis.

An image sensor such as a CCD or CMOS that converts a light signal into an electric signal may be provided below the lens assembly based on the direction of the optical axis, and a filter for blocking or transmitting a light signal of a specific band may also be provided.

As will be described in detail below, when shaking occurs due to hand shaking or the like based on a first direction (Y-axis direction, vertical direction) and a second direction (X-axis direction, horizontal direction) perpendicular to the optical axis, the actuator 100 for driving a reflector of the present invention may implement Optical Image Stabilization (OIS) in the first direction and the second direction by rotationally moving the reflector 110 in a direction that compensates for the movement.

Figure 2:
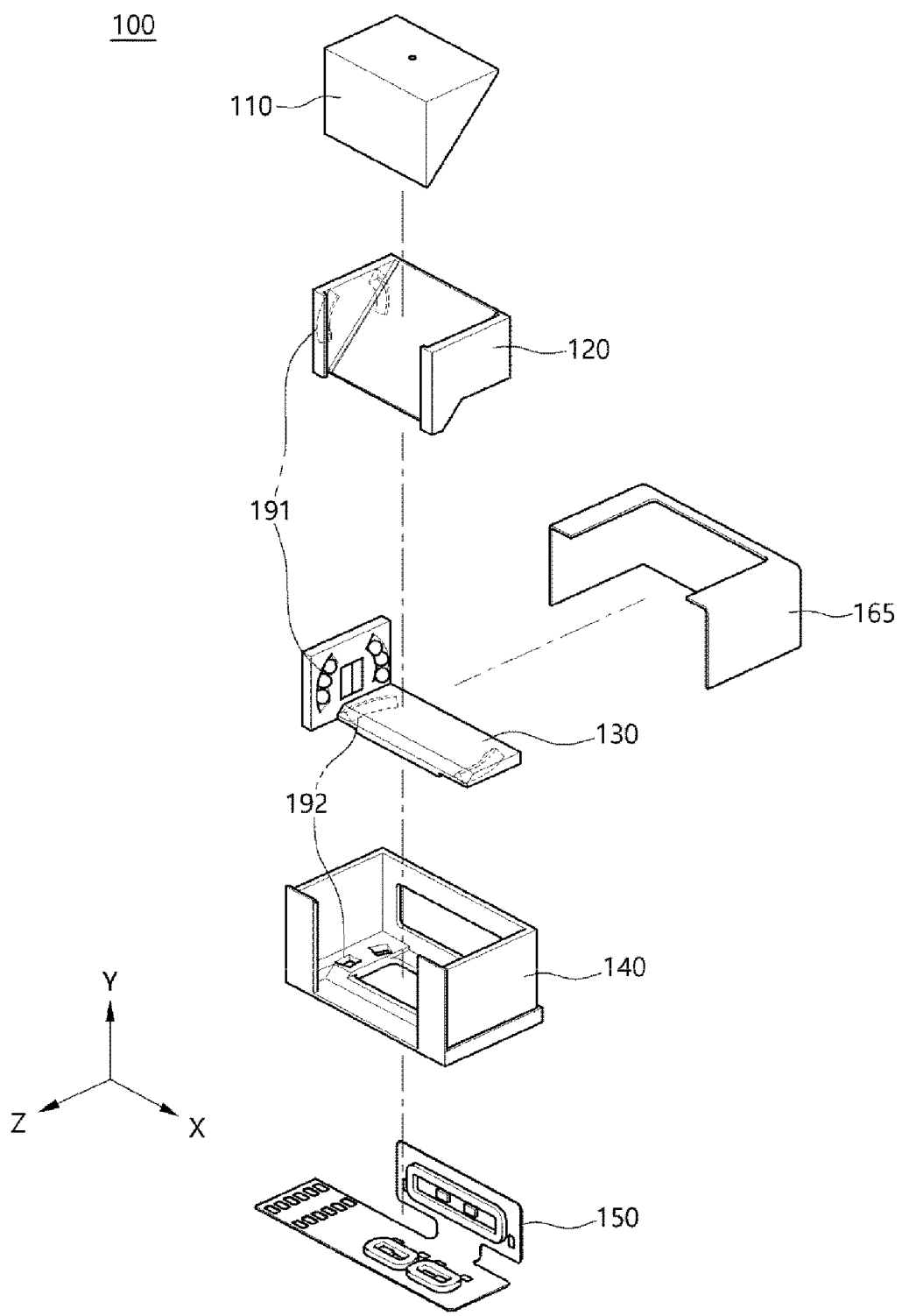
FIGS. 2 and 3 are exploded perspective views of an entirety of the actuator for driving a reflector according to one embodiment of the present invention.
Figure 3:
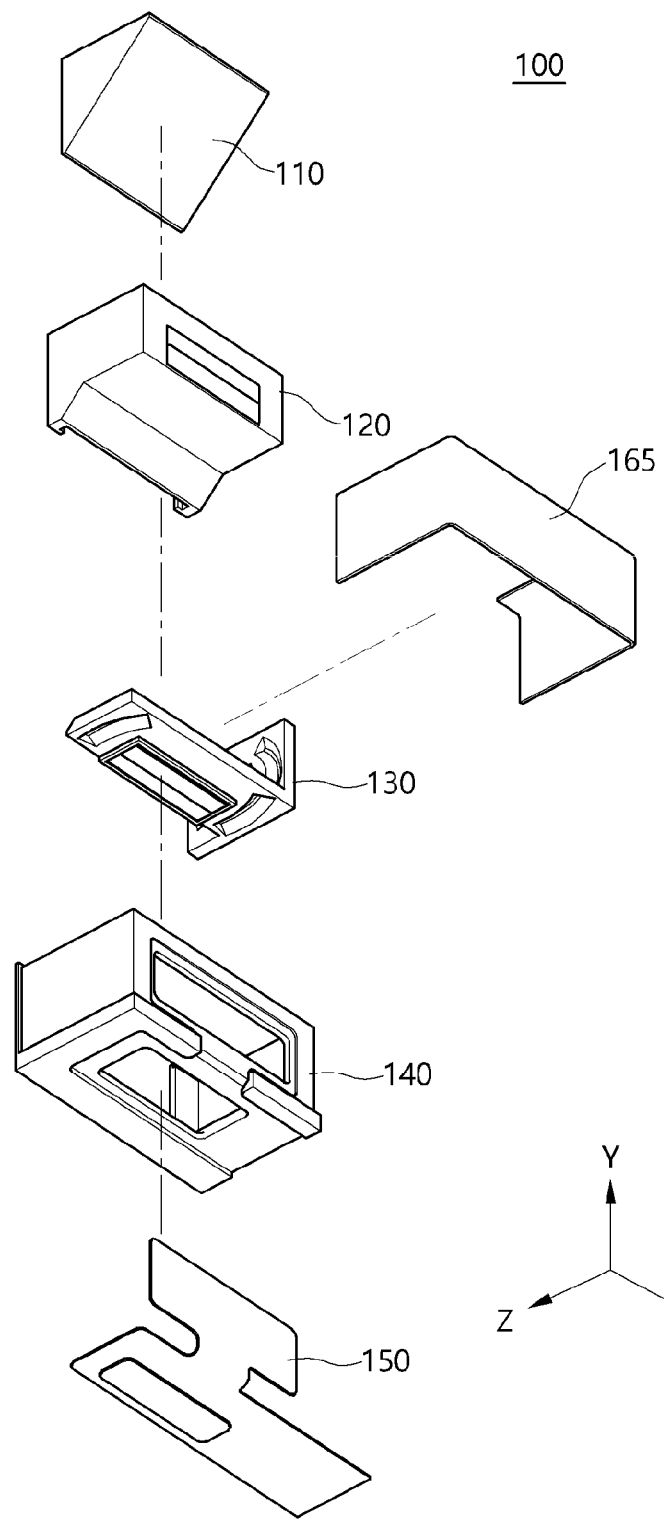

FIGS. 2 and 3 are exploded perspective views of an entirety of the actuator for driving a reflector according to one embodiment of the present invention.

As illustrated in FIGS. 2 and 3, the actuator 100 for driving a reflector according to the embodiment of the present invention may include the reflector 110, a movement frame 120, a first support frame 130, a second support frame 140, a circuit board 150, and a case 165.

Here, the reflector 110 is installed in the movement frame 120, and the first support frame 130 is accommodated in the second support frame 140. In addition, the movement frame 120 in which the reflector 110 is installed is seated on the first support frame 130 and accommodated in the second support frame 140.

In addition, the circuit board 150 is coupled to an outer surface of the second support frame 140, and the case 165 fixes the movement frame 120, the second support frame 140, and the circuit board 150 and functions as a shield can.

As will be described in detail below, the actuator 100 for driving a reflector according to the embodiment of the present invention includes a first rotation guide 191 and a second rotation guide 192 having a ball 160 therein.

Specifically, the first rotation guide 191 is provided between the movement frame 120 and the first support frame 130 and has an arc shape so that the movement frame 120 is rotated in the first direction (Y-axis direction, vertical direction). Moreover, the second rotation guide 192 is provided between the first support frame 130 and the second support frame 140 and has an arc shape so that the first support frame 130 rotates in the second direction (X-axis direction, horizontal direction). Here, at least one of centers of curvature of the first rotation guide 191 and the second rotation guide 192 coincides with a center of rotation of the reflector 110.

In this way, it is preferable that the centers of curvature of the first rotation guide 191 and the second rotation guide 192 coincide with the center of rotation of the reflector 110. However, the present invention is not limited thereto, and even when the centers are partially shifted due to manufacturing tolerances or the like, this falls within a scope of the present invention.

Figure 4:
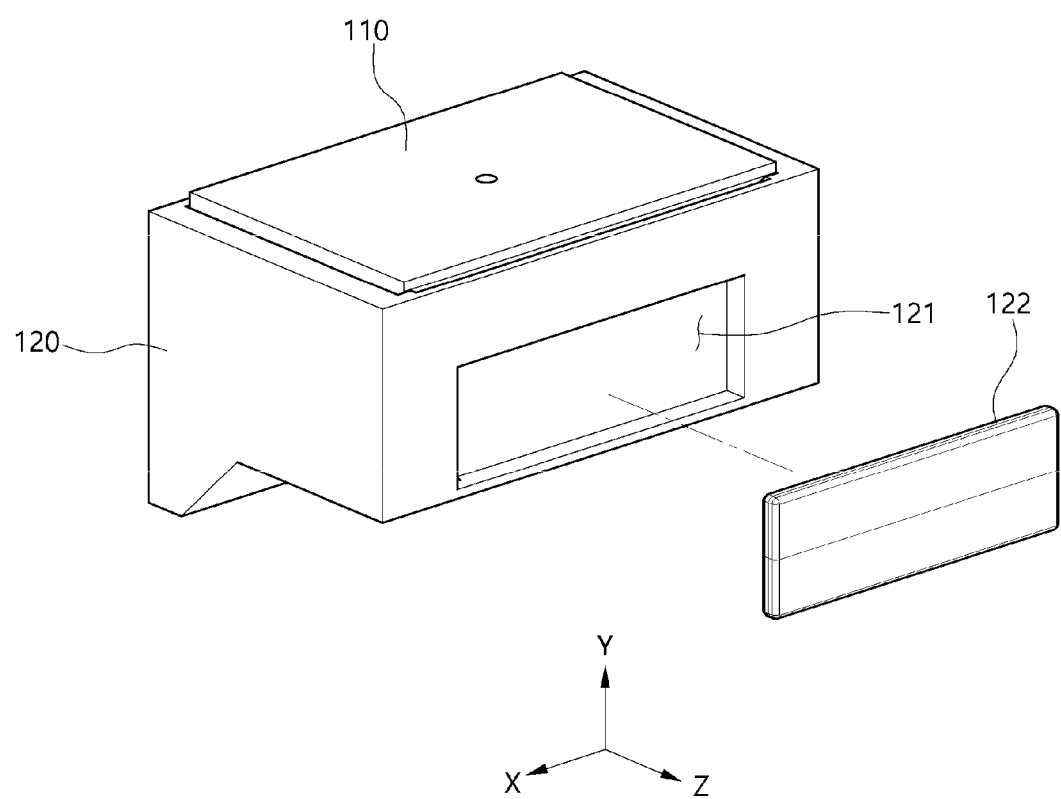
FIGS. 4 and 5 are exploded perspective views of components coupled to a movement frame according to a first embodiment of the present invention.
Figure 5:
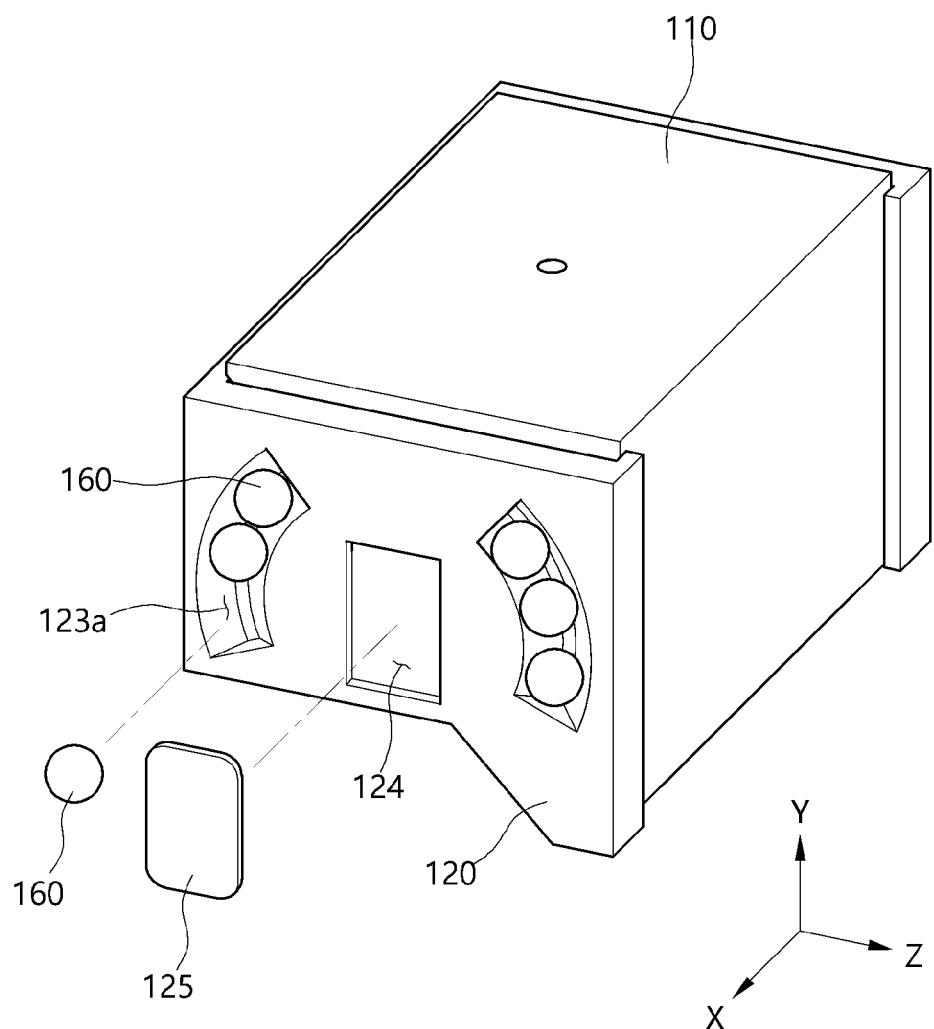
Figure 6:
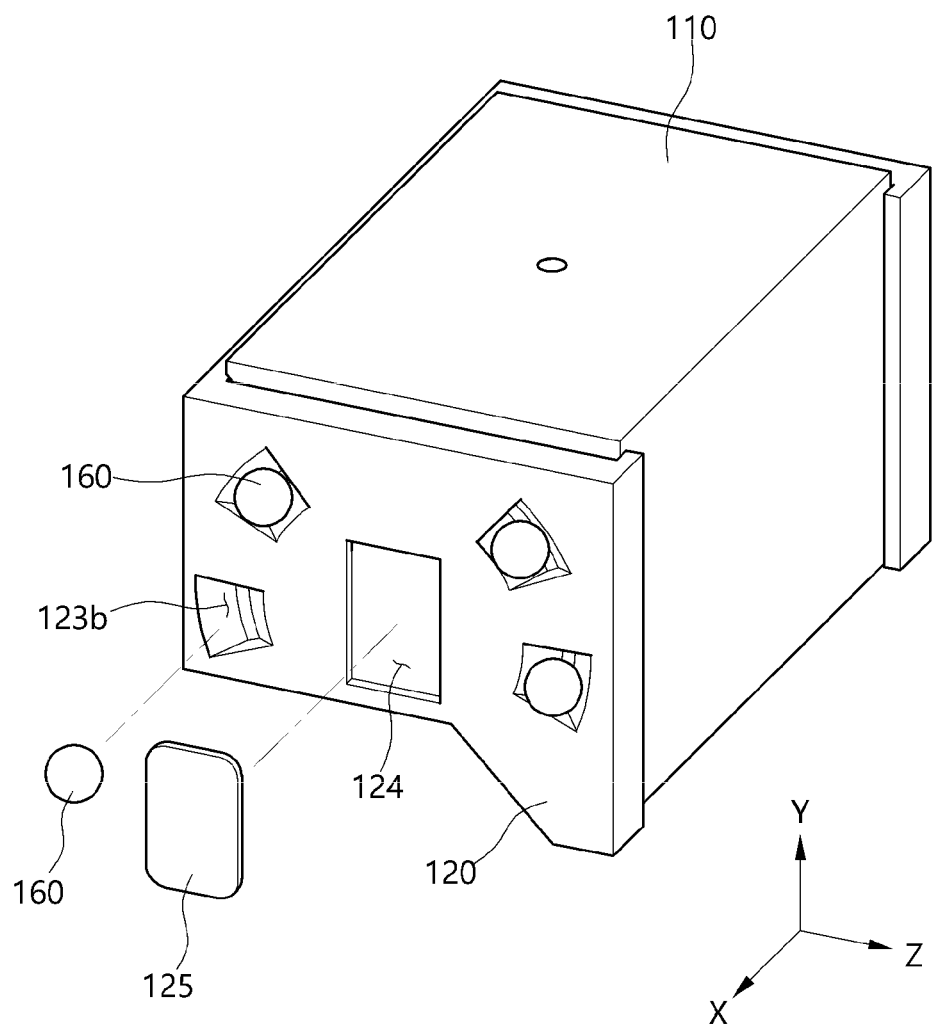
FIG. 6 is an exploded perspective view of components coupled to a movement frame according to a second embodiment of the present invention.

FIGS. 4 and 5 are exploded perspective views of components coupled to a movement frame according to a first embodiment of the present invention, and FIG. 6 is an exploded perspective view of components coupled to a movement frame according to a second embodiment of the present invention.

As illustrated in FIGS. 4 and 5, the movement frame 120 may be provided with the reflector 110, a first magnet 122, and a first yoke 125.

The movement frame 120 provides a seating surface on which the reflector 110 is installed, a first installation groove 121 is formed on an outer surface perpendicular to the direction of the optical axis, and a second installation groove 124 and a first guide rail 123a having an arc shape are formed on an outer surface parallel to the direction of the optical axis. Here, the first guide rails 123a may be provided as the pair of first guide rails 123a facing each other based on the center of curvature of the first rotation guide 191.

The first magnet 122 is installed in the first installation groove 121, and the first yoke 125 is installed in the second installation groove 124. In addition, a plurality of balls 160 are located in the first guide rail 123a. Here, a center of the first yoke 125 coincides with the center of curvature of the first rotation guide 191.

Meanwhile, as illustrated in FIG. 6, a plurality of first holders 123b may be provided instead of the first guide rail 123a. Here, the first holder 123b may be formed in plural and be disposed along an arc shape, and the ball 160 is located inside each first holder 123b.

Figure 7:
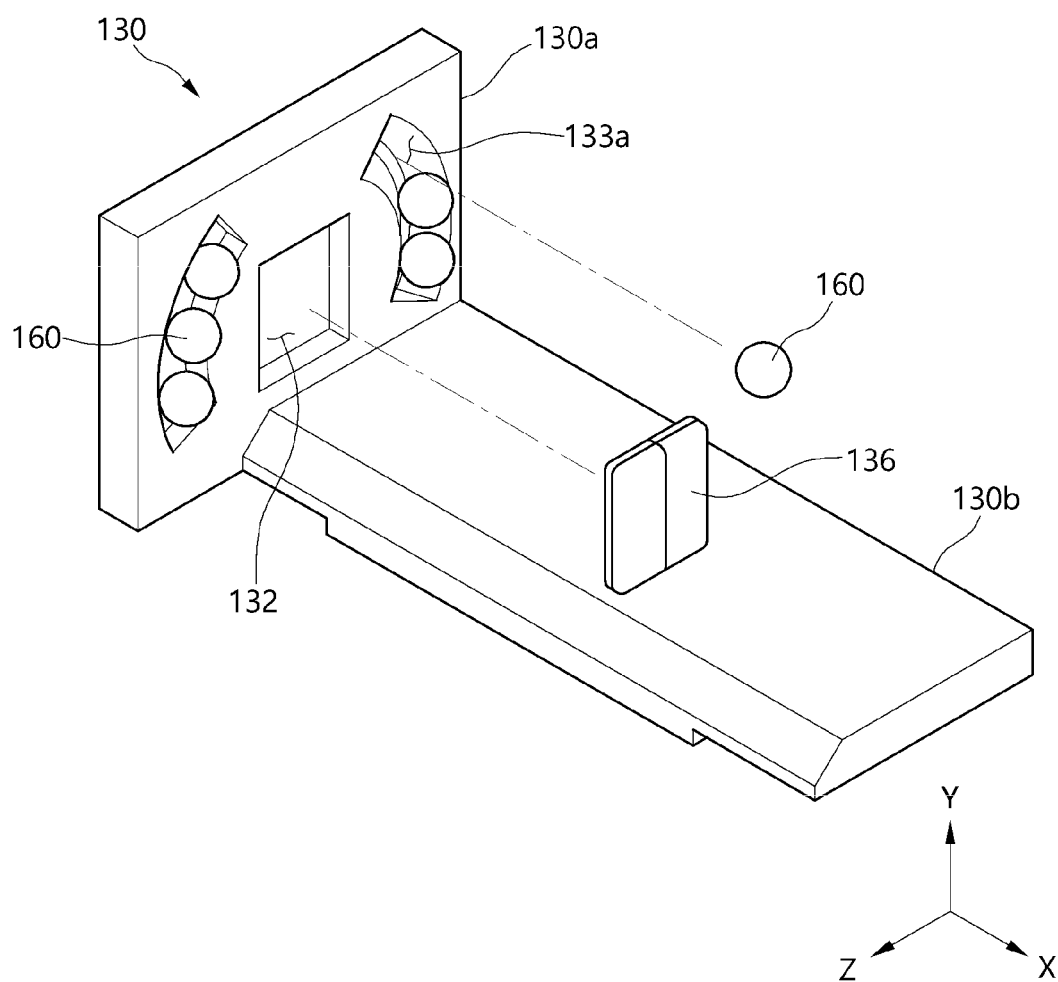
FIGS. 7 and 8 are exploded perspective views of components coupled to a first support frame according to the first embodiment of the present invention.
Figure 8:
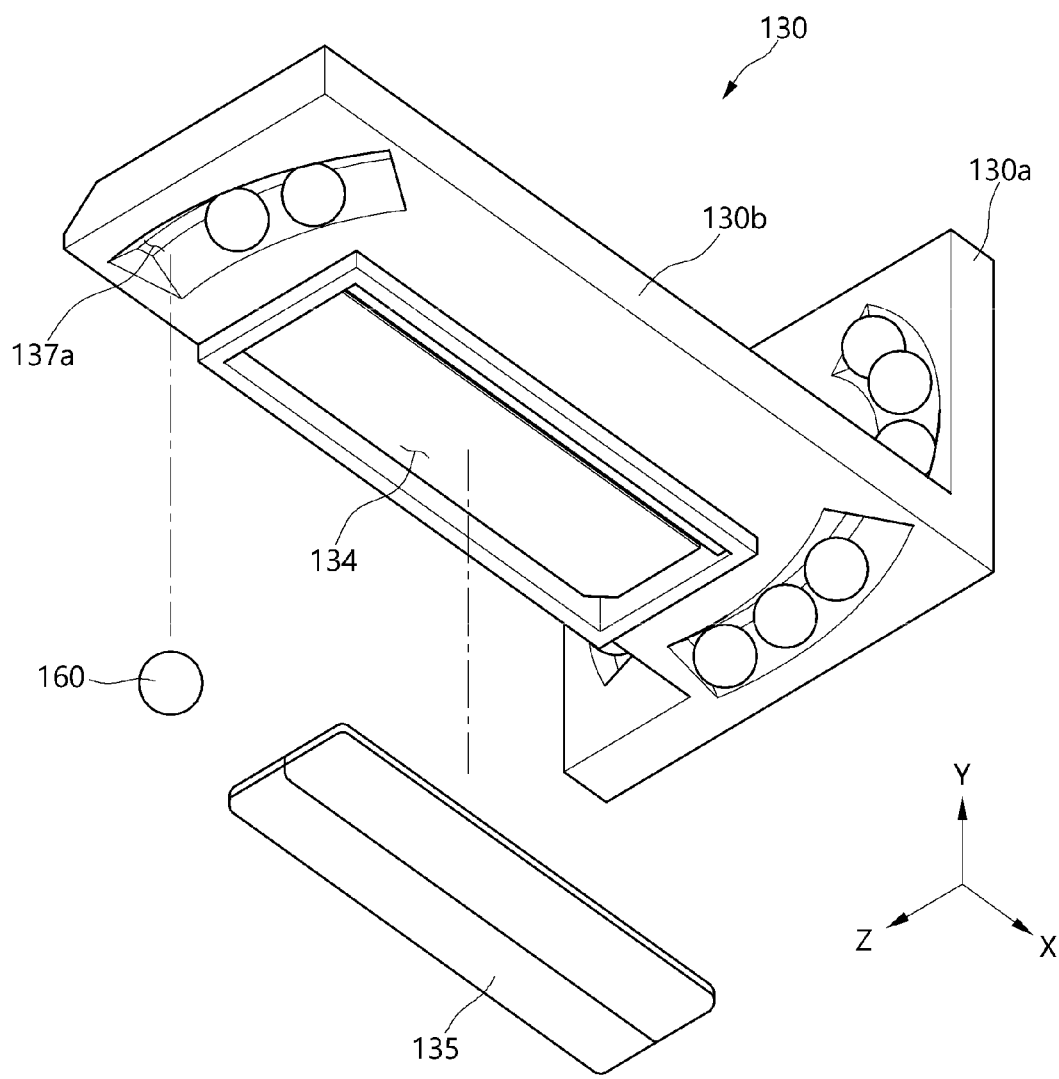
Figure 9:
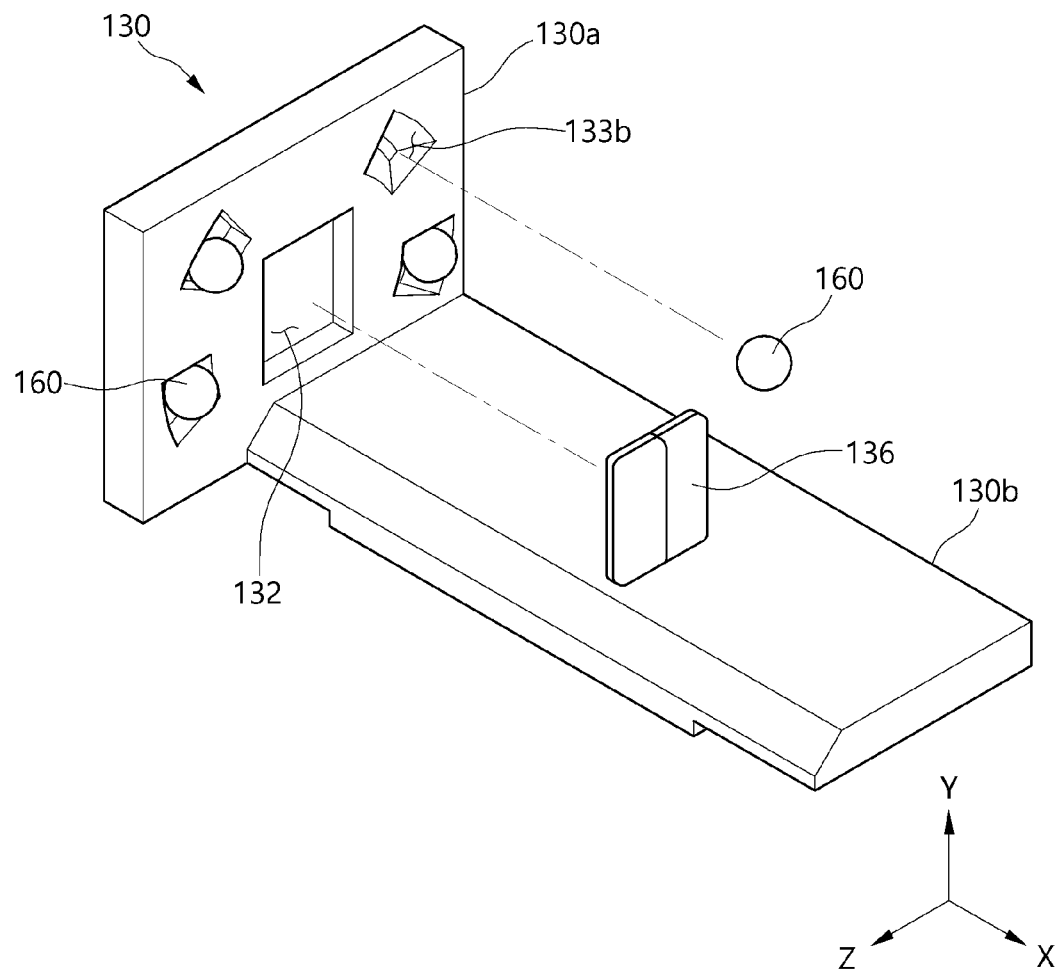
FIGS. 9 and 10 are exploded perspective views of components coupled to a first support frame according to the second embodiment of the present invention.
Figure 10:
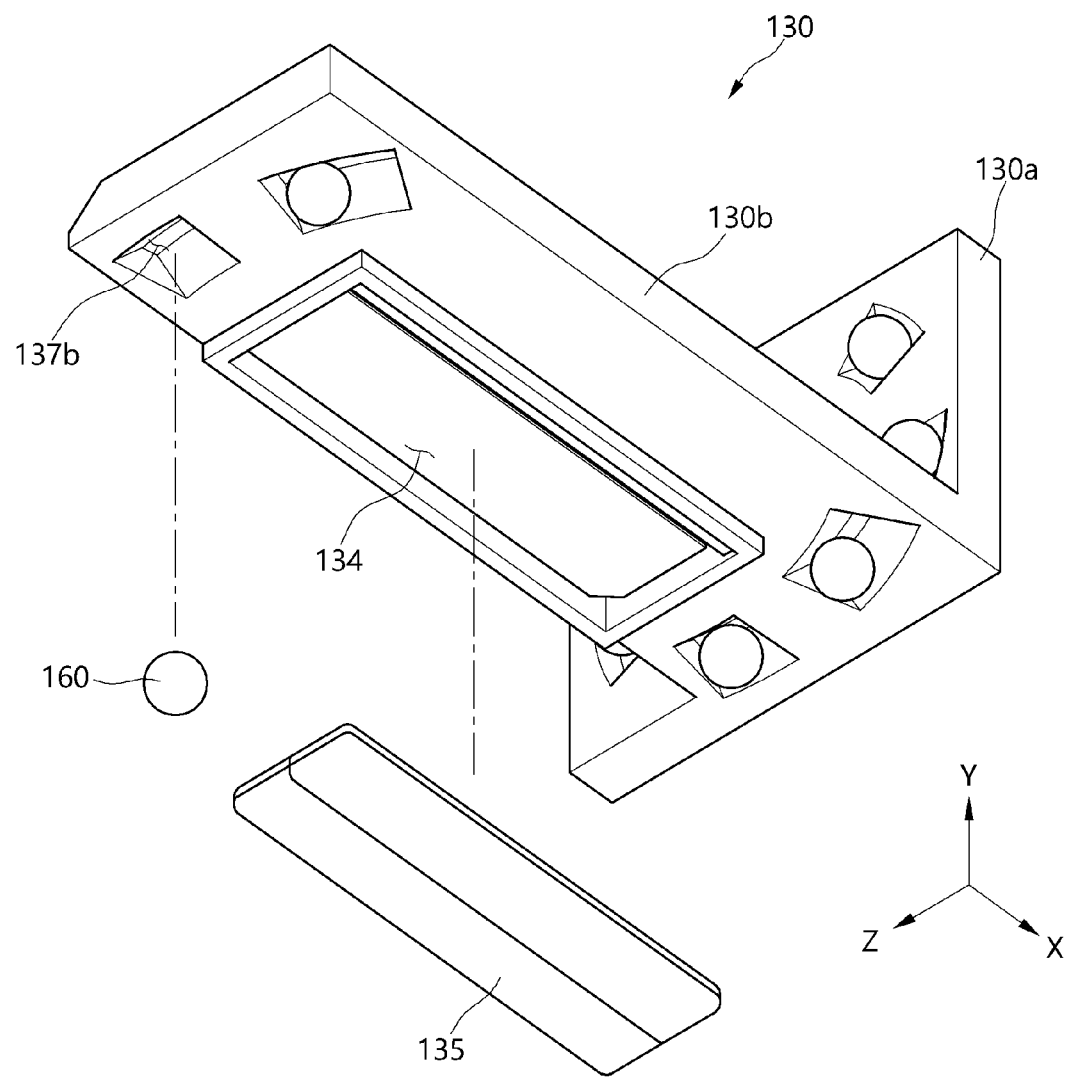

FIGS. 7 and 8 are exploded perspective views of components coupled to the first support frame according to the first embodiment of the present invention, and FIGS. 9 and 10 are exploded perspective views of components coupled to the first support frame according to the second embodiment of the present invention.

As illustrated in FIGS. 7 and 8, the first support frame 130 provides a movement space of the movement frame 120 and may include a second magnet 135 and a third magnet 136.

The first support frame 130 may include a first plate 130a parallel to the direction of the optical axis and a second plate 130b perpendicular to the direction of the optical axis.

The first support frame 130 includes a third installation groove 132 formed inside the first plate 130a, that is, in an inner surface of the first support frame 130 parallel to the direction of the optical axis, and a second guide rail 133a having an arc shape corresponding to the first guide rail 123a of the movement frame 120. Here, the second guide rail 133a may be provided as the pair of second guide rails 133a facing each other based on the center of curvature of the first rotation guide 191.

When the movement frame 120 and the first support frame 130 are coupled to each other, the first guide rail 123a and the second guide rail 133a form the first rotation guide 191, or the first holder 123b and the second guide rail 133a form the first rotation guide 191.

In addition, the first support frame 130 includes a fourth installation groove 134 and a third guide rail 137a having an arc shape that are formed outside the second plate 130b, that is, on an outer surface of the first support frame 130 perpendicular to the direction of the optical axis. Here, the third guide rail 137a may be provided as the pair of third guide rails 137a facing each other based on the center of curvature of the second rotation guide 192.

The second magnet 135 is installed in the fourth installation groove 134, and the third magnet 136 is installed in the third installation groove 132. In addition, a plurality of balls 160 are located in the second guide rail 133a and the third guide rail 137a. Here, the center of the second magnet 135 coincides with the center of curvature of the second rotation guide 192.

Meanwhile, as illustrated in FIGS. 9 and 10, a plurality of second holders 133b may be provided instead of the second guide rail 133a. In this case, when the movement frame 120 and the first support frame 130 are coupled to each other, the first guide rail 123a and the second holder 133b form a first rotation guide. In addition, a plurality of third holders 137b may be provided instead of the third guide rail 137a.

Here, each of the second holder 133b and the third holder 137b may be formed in plural and disposed along an arc shape, and the ball 160 is located inside each holder.

Figure 11:
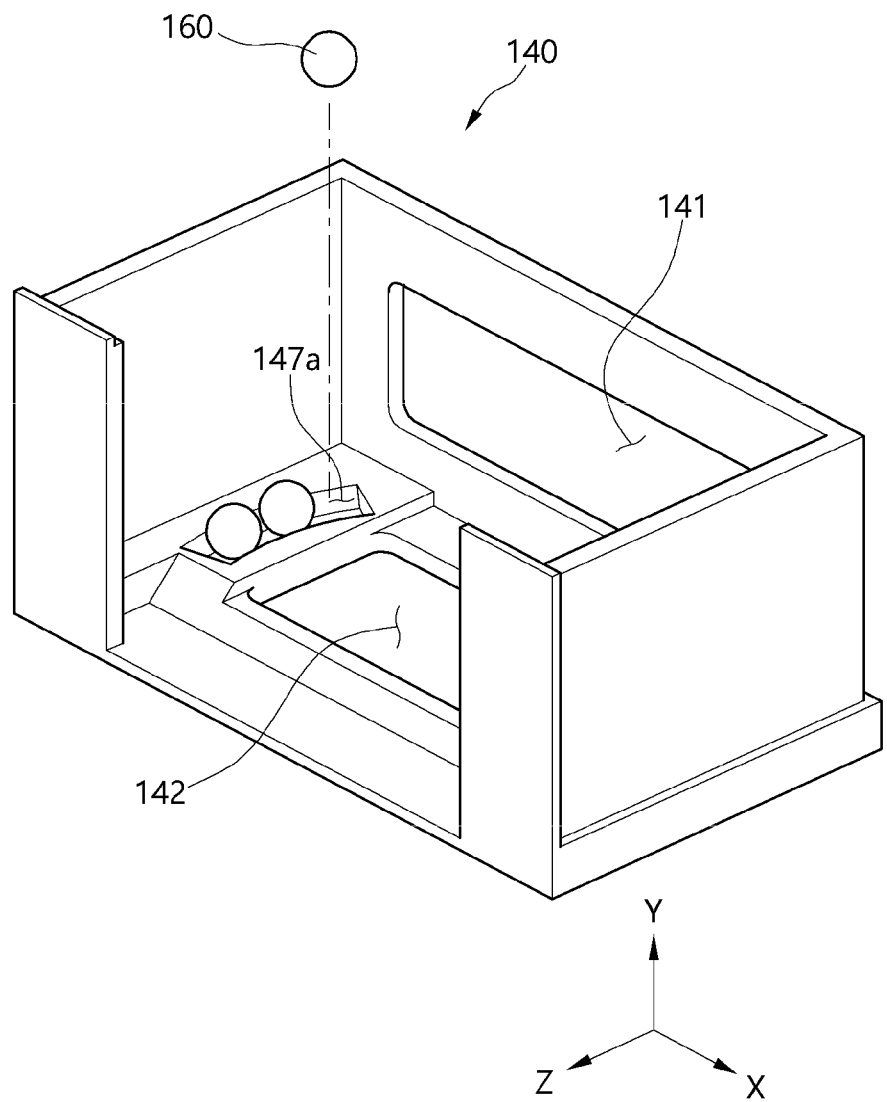
FIGS. 11 and 12 are exploded perspective views of components coupled to a second support frame according to the first embodiment of the present invention.
Figure 12:
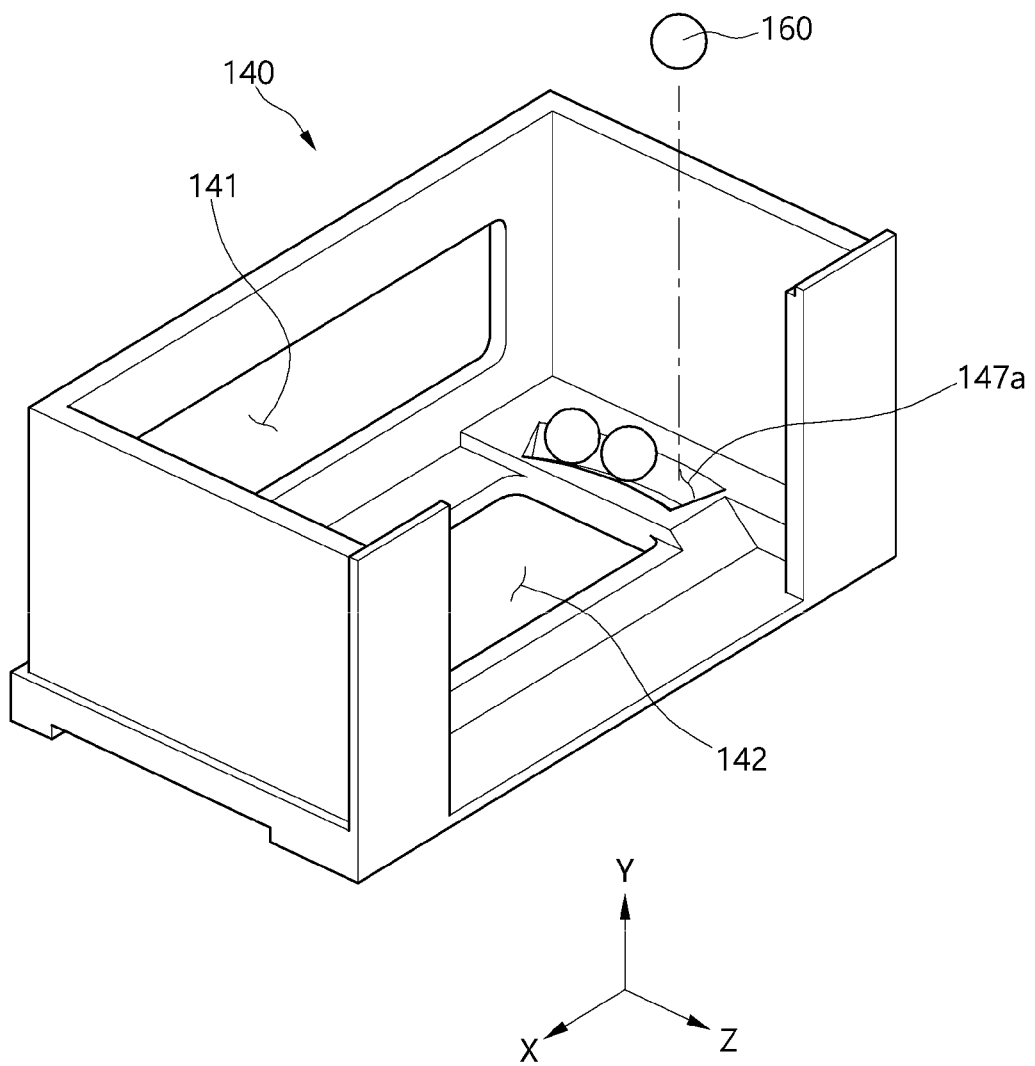
Figure 13:
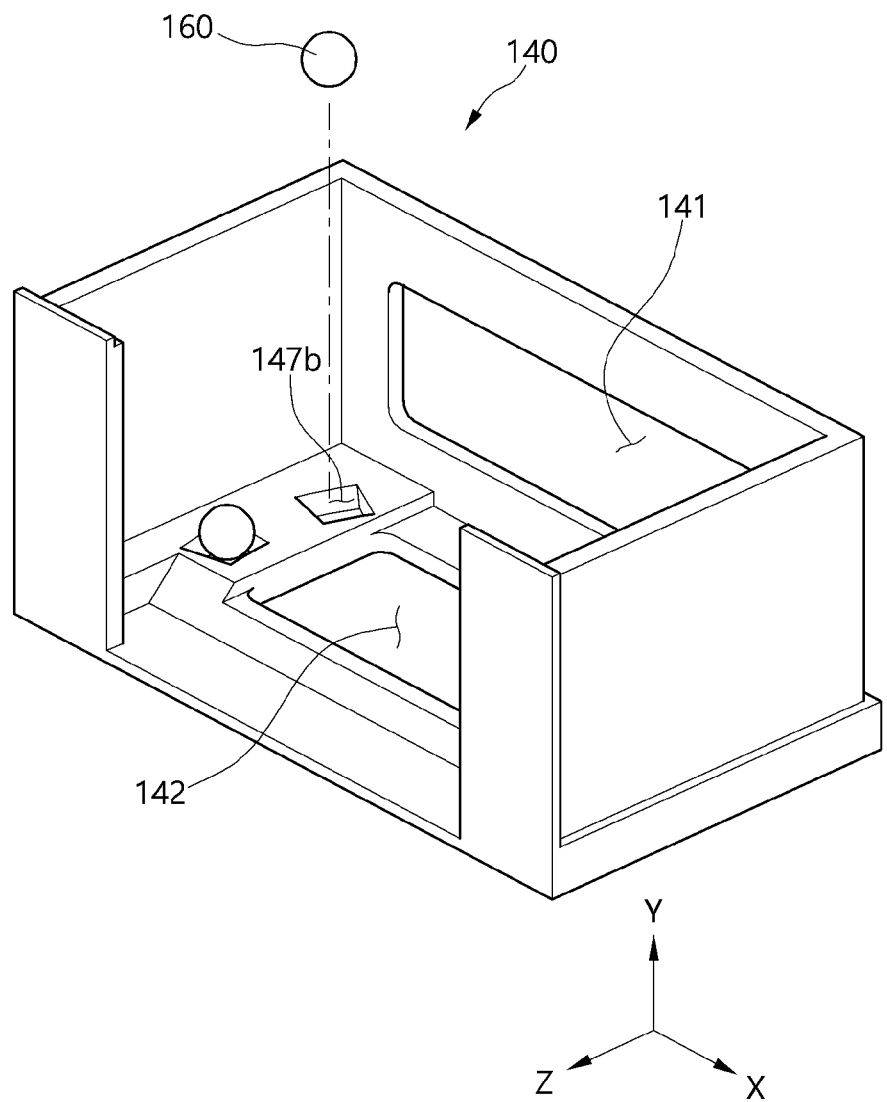
FIGS. 13 and 14 are exploded perspective views of components coupled to a second support frame according to the second embodiment of the present invention.
Figure 14:
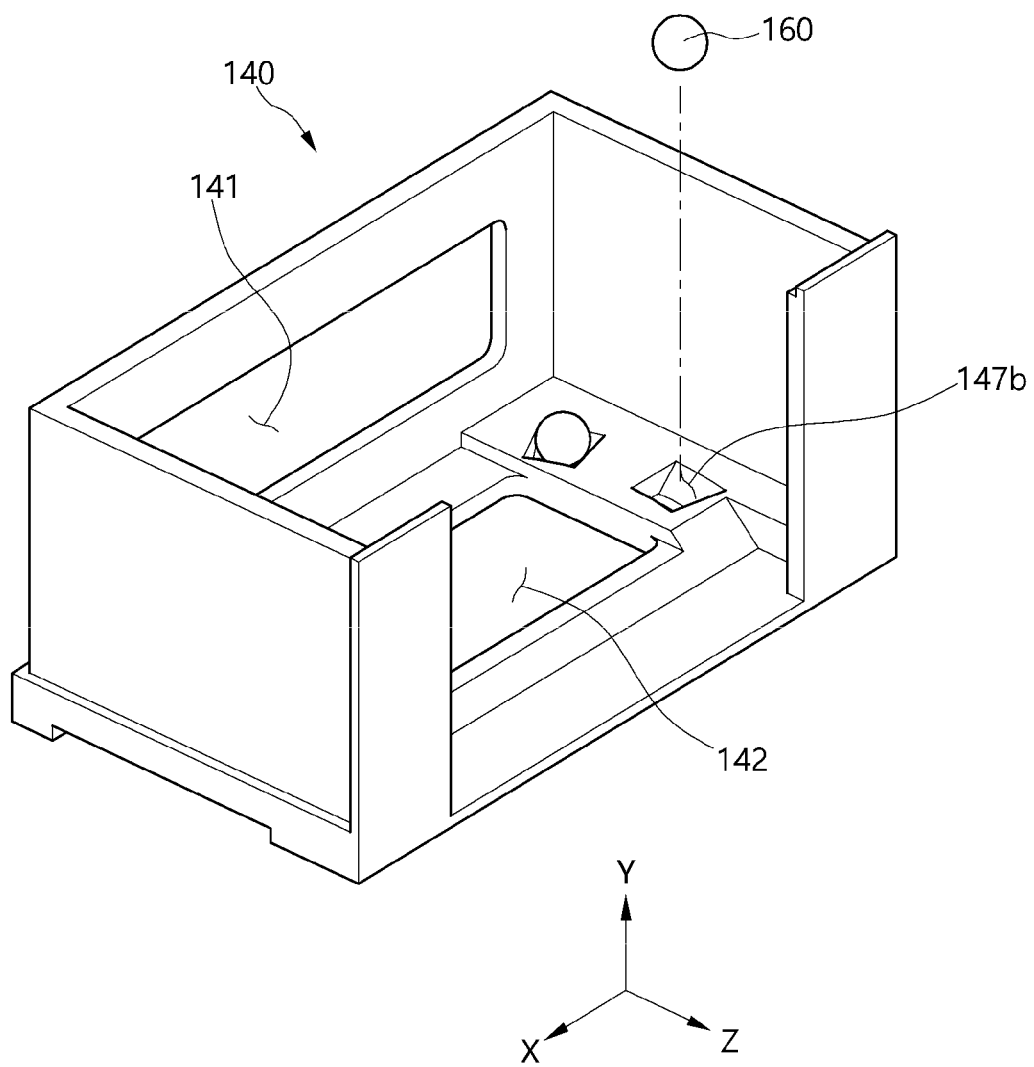

FIGS. 11 and 12 are exploded perspective views of components coupled to the second support frame according to the first embodiment of the present invention, and FIGS. 13 and 14 are exploded perspective views of components coupled to the second support frame according to the second embodiment of the present invention.

As illustrated in FIGS. 11 and 12, the second support frame 140 is formed in a box shape, provides a movement space of the first support frame 130, and has an opening formed in the Y-axis direction which is a light traveling path and the direction of the optical axis. In addition, a first installation hole 141 is formed corresponding to the first magnet 122 of the movement frame 120, and a second installation hole 142 is formed corresponding to the second magnet 135 of the first support frame 130. In addition, a fourth guide rail 147a is formed corresponding to the third guide rail 137a of the first support frame 130. Here, the fourth guide rail 147a may be formed as the pair of fourth guide rails 147a facing each other based on the center of curvature of the second rotation guide 192.

When the first support frame 130 and the second support frame 140 are coupled, the third guide rail 137a and the fourth guide rail 147a form the second rotation guide 192, or the third holder 137b and the fourth guide rail 147a form the second rotation guide 192.

Meanwhile, as illustrated in FIGS. 13 and 14, a plurality of fourth holders 147b may be provided instead of the fourth guide rail 147a. In this case, when the first support frame 130 and the second support frame 140 are coupled, the third guide rail 137a and the fourth holder 147b form the second rotation guide.

Here, the fourth holder 147b may be formed in plural and disposed along an arc shape, and the ball 160 is located inside each fourth holder 147b.

Figure 15:
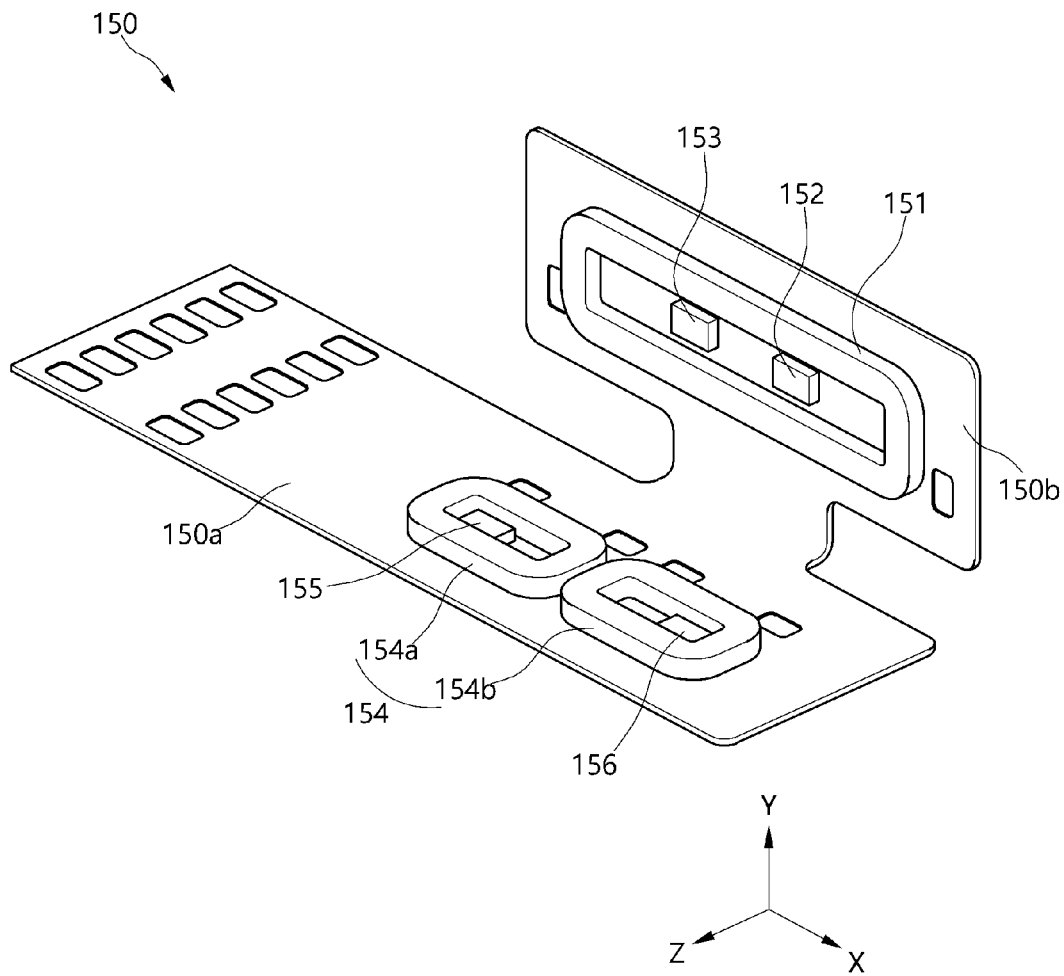
FIG. 15 is a perspective view of an overall assembly of a circuit board according to one embodiment of the present invention.
Figure 16:
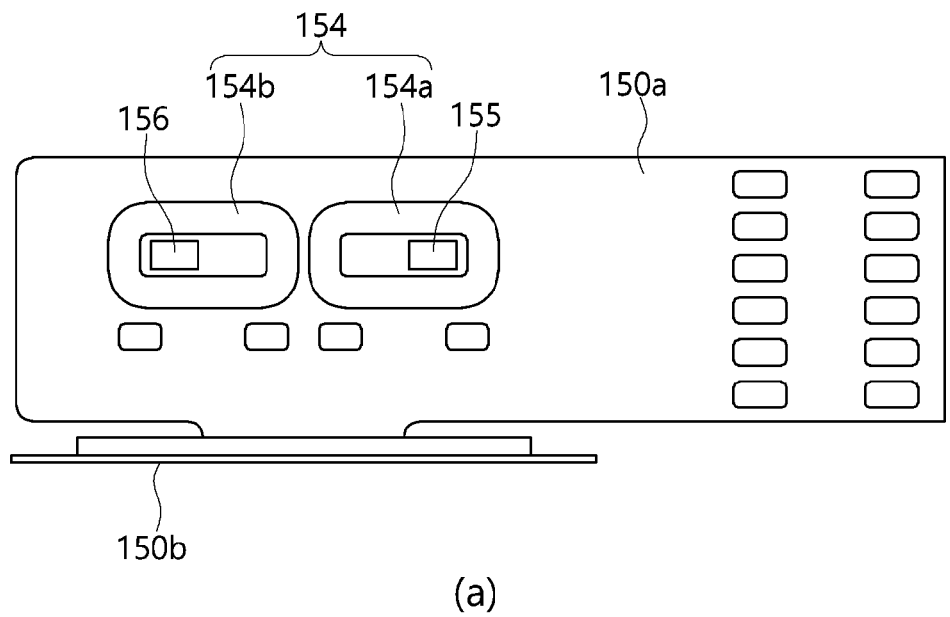
FIG. 16 illustrates plan views of the circuit board according to one embodiment of the present invention.
Figure 16:
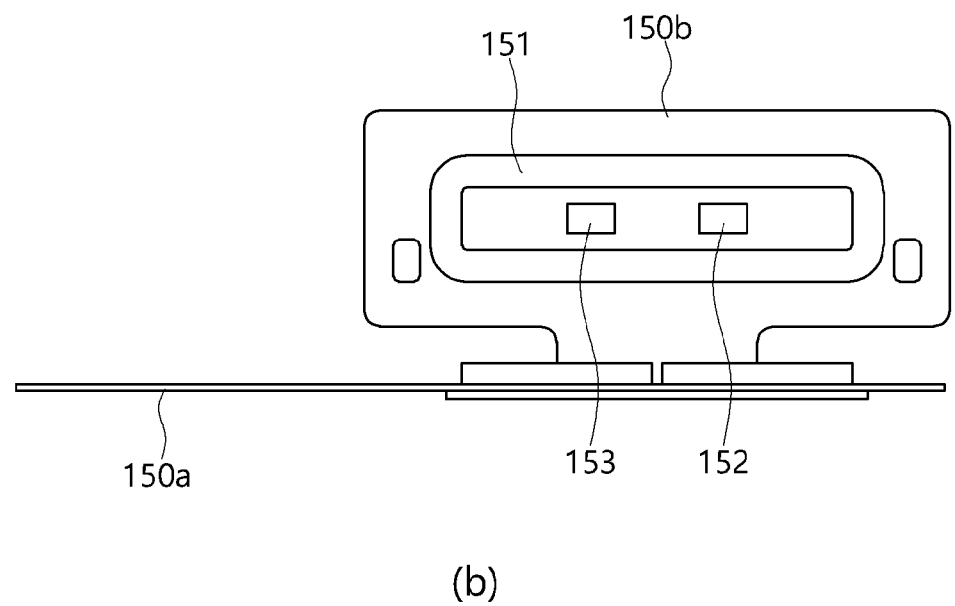

FIG. 15 is a perspective view of an overall assembly of a circuit board according to one embodiment of the present invention, and FIG. 16 illustrates plan views of the circuit board according to one embodiment of the present invention.

As illustrated in FIGS. 15 and 16, the circuit board 150 may include a first drive coil 151, a second drive coil 154, and first to fourth Hall sensors 152, 153, 155, and 156.

The circuit board 150 may include a first circuit board 150a and a second circuit board 150b that is bent to be perpendicular to the first circuit board 150a. Here, the second drive coil 154 and third and fourth Hall sensors 155 and 156 are provided in the first circuit board 150a, and the first drive coil 151 and first and second Hall sensors 152 and 153 are provided in the second circuit board 150b.

The circuit board 150 is coupled to the second support frame 140 so that the first drive coil 151 is installed in the first installation hole 141 of the second support frame 140, and the second drive coil 154 is installed in the second installation hole 142 of the second support frame 140.

Accordingly, the first drive coil 151 and the first magnet 122 of the movement frame 120 face each other, and the second drive coil 154 and the second magnet 135 of the first support frame 130 face each other.

The first drive coil 151 generates an electromagnetic force in the first magnet 122 provided in the movement frame 120 to rotationally move the movement frame 120 in a first direction (Y-axis direction, vertical direction) based on the first support frame 130.

The first magnet 122 receives a driving force due to the electromagnetic force from the first drive coil 151, and the movement frame 120 in which the first magnet 122 is installed is rotationally moved by this driving force based on the first support frame 130.

In this respect, the first support frame 130 providing a movement space of the movement frame 120 corresponds to a fixed body from a relative viewpoint based on the movement frame 120.

In this way, when the movement frame 120, in which the reflector 110 is installed, is rotationally moved (YZ plane) based on the first support frame 130, the reflector 110 physically moves together with the movement frame 120 and is rotationally moved, and a position where the light of the subject is introduced into an image sensor (not illustrated) is shifted by the rotational movement of the reflector 110. Accordingly, the OIS for the first direction is implemented.

Preferably, the first magnet 122 is installed at a center of the movement frame 120 so that the rotational movement of the movement frame 120 is stably supported and driving precision is improved, and a center of the first magnet 122 coincides with a center of rotation of the reflector 110 in the first direction. However, the present invention is not limited thereto, and even when the centers are partially shifted due to manufacturing tolerances or the like, this falls within the scope of the present invention.

The ball 160 is located in the first rotation guide 191 between the movement frame 120 and the first support frame 130, and the movement frame 120 rotationally moves in a state of being in contact with the ball 160.

The first yoke 125 provided in the movement frame 120 is made of a magnetic material such as metal and performs a function of generating an attractive force in the third magnet 136 provided in the first support frame 130.

The first support frame 130, in which the third magnet 136 is installed, is pulled in a direction in which the first yoke 125 is provided, that is, in a direction of the first support frame 130 by the attractive force generated as described above. Accordingly, the movement frame 120 and the ball 160 are pressed against each other, and the ball 160 and the first support frame 130 are pressed against each other.

In addition, the first yoke 125 may also perform a function of returning the movement frame 120 to an original reference position when power being supplied to the first drive coil 151 is stopped. In order to improve efficiency of a functional control for the rotational movement of the movement frame 120 as well as returning to the reference position, preferably, a center of the first yoke 125 coincides with a center of the third magnet 136, and a shape of the first yoke 125 is the same as that of the third magnet 136.

The first and second Hall sensors 152 and 153 use a Hall effect to detect a position (specifically, a position of the reflector 110 installed in the movement frame 120 in which the first magnet 122 is provided) of the first magnet 122.

The first and second Hall sensors 152 and 153 may be implemented in the form of a single chip together with a driving driver that controls a magnitude and direction of power applied to the first drive coil 151 using output values of the first and second Hall sensors 152 and 153 for feedback control.

Meanwhile, the present invention includes two first and second Hall sensors 152 and 153 to compensate for crosstalk, and when the first and second Hall sensors 152 and 153 are disposed at the inner edge of the first drive coil 151, a compensation amount of the crosstalk increases as the position of the first magnet 122 changes. In order to solve the problem, it is preferable that the first and second Hall sensors 152 and 153 are disposed at an inner center of the first drive coil 151.

When the first rotation guide includes the first holder 123b or the second holder 133b, the movement frame 120 is rotationally moved by the ball 160 constrained by the first holder 123b or the second holder 133b rotationally moving along the first guide rail 123a or the second guide rail 133a.

Specifically, the ball 160 may perform a rolling or rotating movement in a state of being accommodated in the first holder 123b or the second holder 133b, and a distance between the balls 160 is kept constant. Therefore, it is possible to essentially solve problems of devices of the related art such as support instability caused by free movement of the ball, tilt of the moving body, degradation of the driving precision, or the like.

Furthermore, in the case of the present invention, since the balls 160 may be spaced apart from each other by an appropriate distance, an additional space can be secured, and a ball having a relatively larger size can be applied.

In addition, preferably, the inner surface of the first holder 123b or the second holder 133b becomes narrower inward so that a point contact with the ball 160 and physical support by the ball 160 are more effectively implemented.

The second drive coil 154 generates an electromagnetic force in the second magnet 135 provided in the first support frame 130 to rotationally move the first support frame 130 in the second direction (X-axis direction, horizontal direction) based on the second support frame 140.

The second magnet 135 receives a driving force by the electromagnetic force from the second drive coil 154, and the first support frame 130 in which the second magnet 135 is installed is rotationally moved based on the second support frame 140 by this driving force.

In this respect, the second support frame 140 providing a movement space of the first support frame 130 corresponds to a fixed body from a relative viewpoint based on the first support frame 130.

In this way, when the first support frame 130, in which the movement frame 120 is installed, is rotationally moved (XZ plane) based on the second support frame 140, the reflector 110 physically moves together with the first support frame 130 and is rotationally moved, and a position where the light of the subject is introduced into an image sensor (not illustrated) is shifted by the rotational movement of the reflector 110. Accordingly, the OIS for the second direction is implemented.

Preferably, the second magnet 135 is installed at a center of the first support frame 130 so that the rotational movement of the first support frame 130 is stably supported and driving precision is improved, and a center of the second magnet 135 coincides with a center of rotation of the reflector 110 in the second direction. However, the present invention is not limited thereto, and even when the centers are partially shifted due to manufacturing tolerances or the like, this falls within the scope of the present invention.

The ball 160 is located in the second rotation guide 192 between the first support frame 130 and the second support frame 140, and the first support frame 130 rotationally moves in a state of being in contact with the ball 160.

Although not illustrated in the drawings, a second yoke may be provided below the circuit board 150. Here, the second yoke is disposed at a position corresponding to the second magnet 135.

The second yoke is made of a magnetic material such as metal and performs a function of generating an attractive force in the second magnet 135 provided in the first support frame 130.

The first support frame 130, in which the second magnet 135 is installed, is pulled in a direction in which the second yoke is provided, that is, in a direction of the second support frame 140 by the attractive force generated as described above. Accordingly, the first support frame 130 and the ball 160 are pressed against each other, and the ball 160 and the second support frame 140 are pressed against each other.

In addition, the second yoke may also perform a function of returning the first support frame 130 to an original reference position when the power being supplied to the first drive coil 151 is stopped. In order to improve efficiency of a functional control for the rotational movement of the first support frame 130 as well as returning to the reference position, preferably, a center of the second yoke coincides with a center of the second magnet 135, and a shape of the second yoke is the same as that of the second magnet 135.

The third and fourth Hall sensors 155 and 156 use a Hall effect to detect a position (specifically, the position of the reflector 110 installed in the first support frame 130 in which the second magnet 135 is provided) of the second magnet 135.

The third and fourth Hall sensors 155 and 156 may be implemented in the form of a single chip together with a driving driver that controls a magnitude and direction of power applied to the second drive coil 154 using output values of the third and fourth Hall sensors 155 and 156 for feedback control.

The second drive coil 154 includes a first sub-drive coil 154a that rotationally moves the first support frame 130 in a first rotation direction (for example, clockwise direction) and a second sub-drive coil 154b that rotationally moves the first support frame 130 in a second rotation direction (for example, counterclockwise direction) opposite to the first rotation direction.

Here, in order to increase the output values of the third and fourth Hall sensors 155 and 156, preferably, the third and fourth Hall sensors 155 and 156 are respectively disposed at inner edges of the first sub-drive coil 154a and the second sub-drive coil 154b and each disposed at the edge farthest from the center of curvature of the second rotation guide 192.

When the second rotation guide includes the third holder 137b or the fourth holder 147b, the first support frame 130 is rotationally moved by the ball 160 constrained by the third holder 137b or the fourth holder 147b rotationally moving along the third guide rail 137a or the second guide rail 147a.

Specifically, the ball 160 may perform a rolling or rotating movement in a state of being accommodated in the third holder 137b or the fourth holder 147b, and a distance between the balls 160 is kept constant. Therefore, it is possible to essentially solve problems of devices of the related art such as support instability caused by the free movement of the ball, the tilt of the moving body, the degradation of the driving precision, or the like.

Furthermore, in the case of the present invention, since the balls 160 may be spaced apart from each other by an appropriate distance, an additional space can be secured, and a ball having a relatively larger size can be applied.

In addition, preferably, the inner surface of the third holder 137b or the fourth holder 147b becomes narrower inward so that the point contact with the ball 160 and the physical support by the ball 160 are more effectively implemented.

Figure 17:
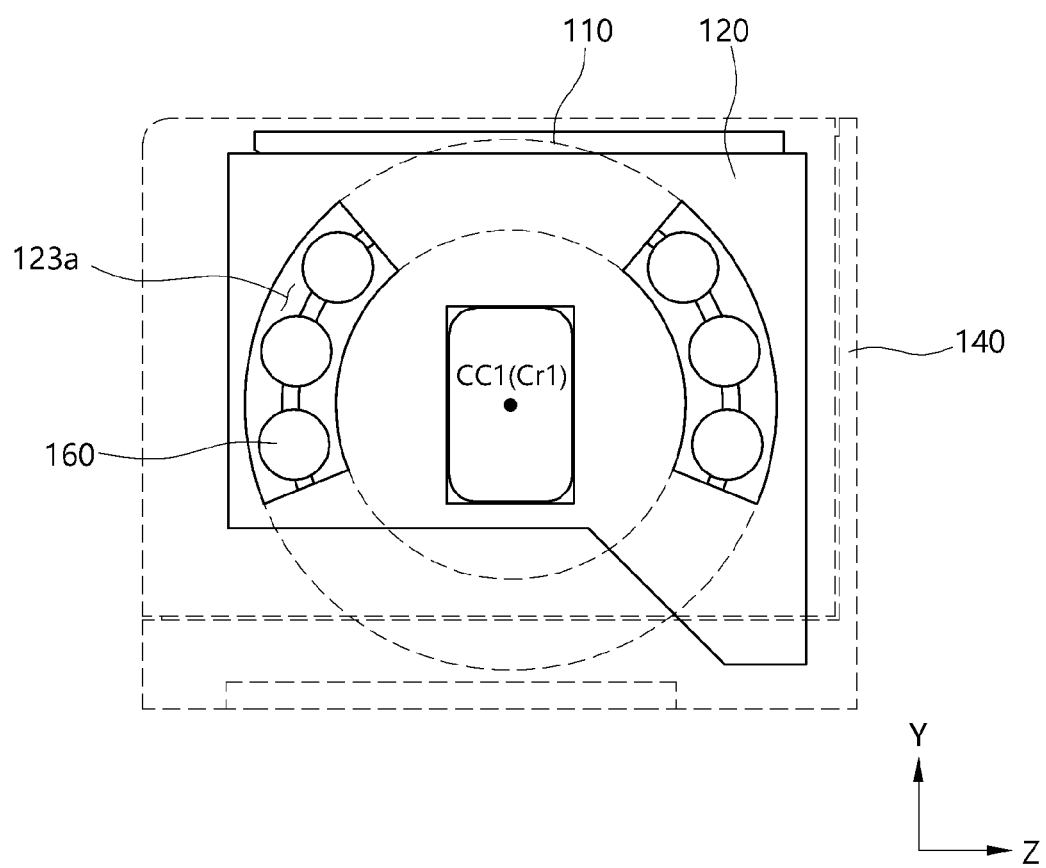
FIG. 17 is a view for describing structural features of a first rotation guide of the actuator for driving a reflector according to one embodiment of the present invention.

FIG. 17 is a view for describing structural features of the first rotation guide 191 of the actuator for driving a reflector according to one embodiment of the present invention.

Referring to FIG. 17, in the actuator 100 for driving a reflector according to one embodiment of the present invention, a center of curvature CC1 of the first rotation guide 191 (for example, the first guide rail 123a) coincides with a center of rotation Cr1 of the reflector 110 in the first direction.

Meanwhile, when the center of curvature CC1 of the first rotation guide 191 and the center of rotation Cr1 of the reflector 110 in the first direction do not coincide with each other, even when the same driving force is applied to the first magnet 122, an amount of rotation of the movement frame 120 differs depending on the position of the movement frame 120, and there is a problem in that a separate compensation algorithm should be applied to compensate for the different amount of rotation for each position.

However, in the actuator 100 for driving a reflector according to the embodiment of the present invention, the center of curvature CC1 of the first rotation guide 191 coincides with the center of rotation Cr1 of the reflector 110. Accordingly, regardless of the position of the movement frame 120 for the same driving force, since the amount of rotation of the movement frame 120 is the same, the separate compensation algorithm is not required.

Figure 18:
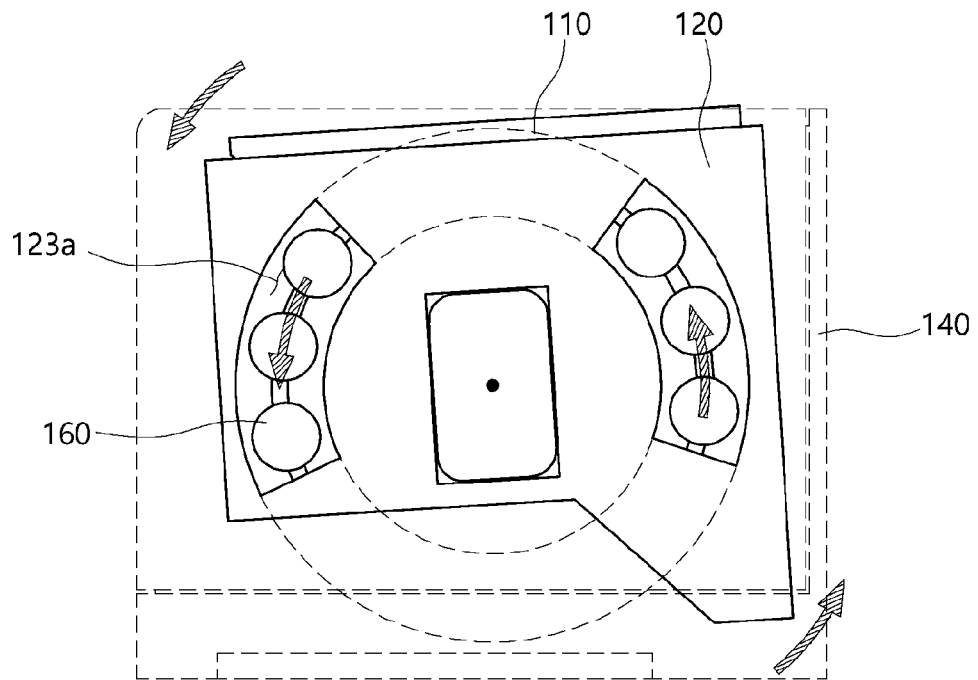
FIG. 18 illustrates views for describing a driving method using the first rotation guide of the actuator for driving a reflector according to one embodiment of the present invention.
Figure 18:
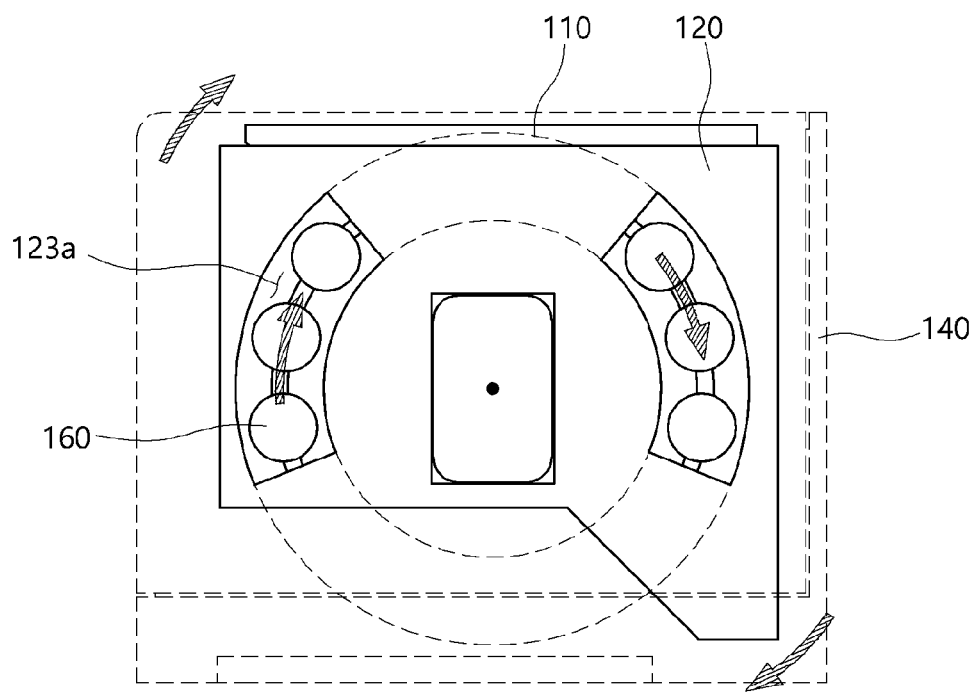

FIG. 18 illustrates views for describing a driving method using the first rotation guide 191 of the actuator for driving a reflector according to one embodiment of the present invention.

First, as illustrated in FIG. 18A, when the first drive coil 151 generates an electromagnetic force in the first magnet 122 so that the movement frame 120 rotationally moves in the first rotation direction (for example, counterclockwise direction), the reflector 110 also rotationally moves together.

Next, as illustrated in FIG. 18B, when the power being supplied to the first drive coil 151 is stopped, the movement frame 120 is returned to the original reference position by the attraction forces of the first yoke 125 and the third magnet 136.

Figure 19:
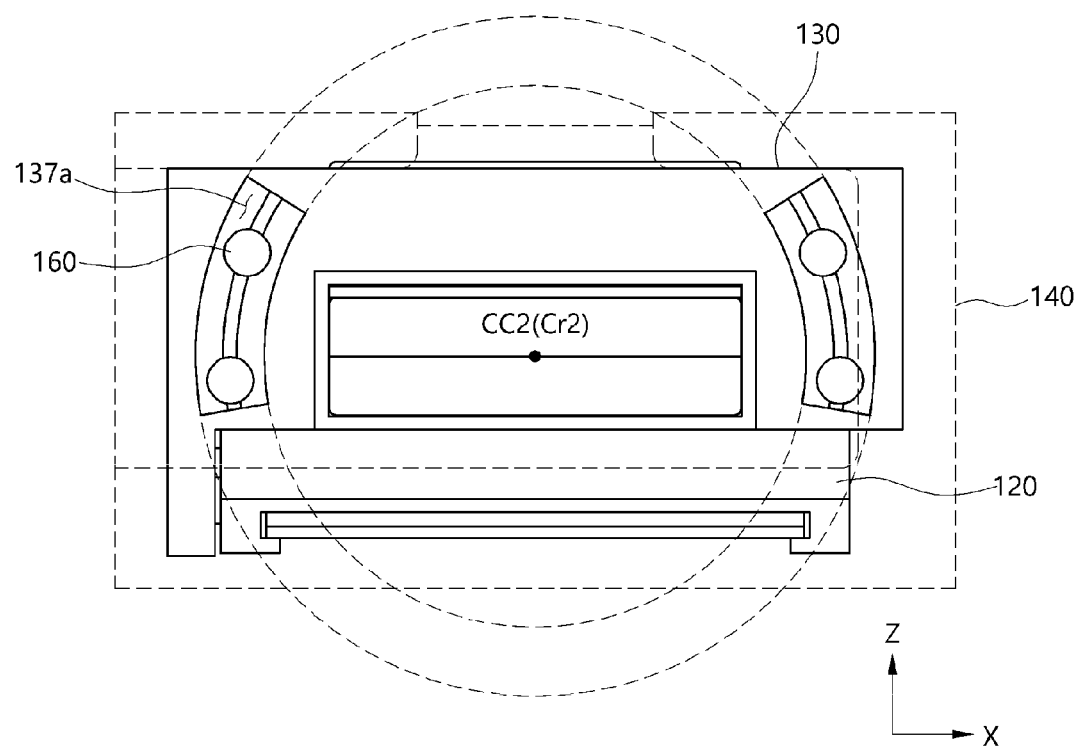
FIG. 19 is a view for describing structural features of a second rotation guide of the actuator for driving a reflector according to one embodiment of the present invention.

FIG. 19 is a view for describing structural features of the second rotation guide 192 of the actuator for driving a reflector according to one embodiment of the present invention.

Referring to FIG. 19, in the actuator 100 for driving a reflector according to one embodiment of the present invention, a center of curvature CC2 of the second rotation guide 192 (for example, the third guide rail 137a) coincides with a center of rotation Cr2 of the reflector 110 in the second direction.

Meanwhile, when the center of curvature CC2 of the second rotation guide 192 and the center of rotation Cr2 of the reflector 110 in the second direction do not coincide with each other, even when the same driving force is applied to the second magnet 135, an amount of rotation of the first support frame 130 differs depending on the position of the first support frame 130, and there is a problem in that a separate compensation algorithm should be applied to compensate for the different amount of rotation for each position.

However, in the actuator 100 for driving a reflector according to the embodiment of the present invention, the center of curvature CC2 of the second rotation guide 192 coincides with the center of rotation Cr2 of the reflector 110 in the second direction. Accordingly, regardless of the position of the first support frame 130 for the same driving force, since the amount of rotation of the first support frame 130 is the same, the separate compensation algorithm is not required.

Figure 20:
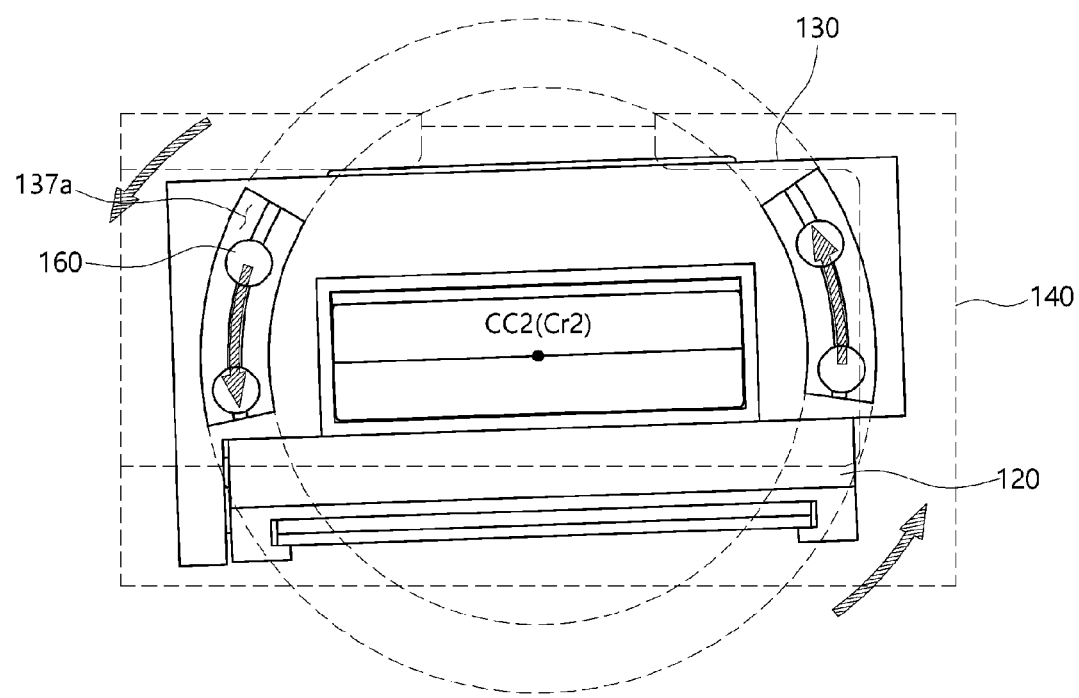
FIG. 20 illustrates views for describing a driving method using the second rotation guide of the actuator for driving a reflector according to one embodiment of the present invention.
Figure 20:
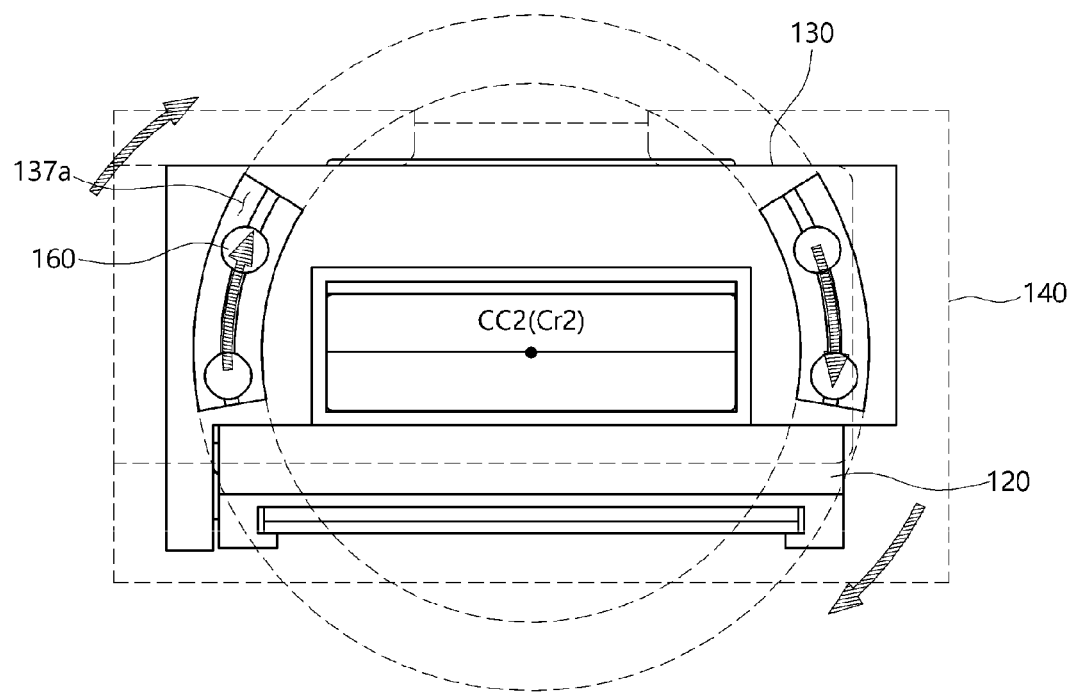

FIG. 20 illustrates views for describing a driving method using the second rotation guide 192 of the actuator for driving a reflector according to one embodiment of the present invention.

First, as illustrated in FIG. 20A, when the second drive coil 154 generates an electromagnetic force in the second magnet 135 so that the first support frame 130 rotationally moves in the first rotation direction (for example, counterclockwise direction), the movement frame 120 and the reflector 110 also rotationally moves together.

Next, as illustrated in FIG. 20B, when the power being supplied to the second drive coil 154 is stopped, the first support frame 130 is returned to the original reference position by the attraction forces of the second yoke and the second magnet 135.

According to the present invention, the center of curvature of the rotation guide coincides with the center of rotation of the reflector. Accordingly, for the same driving force, the amount of rotation of the moving body can be the same regardless of the position of the moving body.

In addition, according to the present invention, the position of the ball disposed between the moving body and the fixed body to guide the rotational movement of the moving body is specified at an exact position regardless of the OIS drive. Accordingly, physical support according to the rotational movement of the moving body is made to be more balanced, and thus a phenomenon that the moving body is tilted can be fundamentally prevented.

In addition, according to the present invention, the plurality of balls are disposed, but a pitch between the balls can be designed to be optimized for the rotational movement of the moving body, and thus more stable physical support and the precision of the OIS can be further improved due to the stable physical support.

In addition, according to the present invention, the ball having a relatively large size can be disposed in the actuator having the same size, and thus behavior of the ball can be improved. Moreover, it is possible to further suppress adverse physical influences generated between the ball and the guide rail to improve driving performance and further increase durability.

Heretofore, the present invention is described by the limited embodiments and drawings. However, the present invention is not limited thereto, and it goes without saying that various modifications and variations are possible within an equivalent range of a technical idea of the present invention and claims described below by those of ordinary skill in a technical field to which the present invention belongs.

In the above description of the present invention, modifiers such as first and second are only terms of instrumental concepts used to relatively distinguish components between each other, and thus the modifiers should not be interpreted as terms used to indicate a specific order, priority, or the like.

The accompanying drawings for descriptions of the present invention and the embodiments thereof may be illustrated in a somewhat exaggerated form in order to emphasize or highlight a technical content according to the present invention. However, it is obvious that various types of modifications can be applied at a level of a person skilled in the art in consideration of the above-described contents and items illustrated in the drawings

What is claimed is:

1. An actuator for driving a reflector, comprising:
   a movement frame comprising the reflector configured to reflect or refract a light to a lens and a first magnet;
   a first support frame configured to provide a first space for the movement frame to move;
   a first drive coil configured to generate a first electromagnetic force in the first magnet to rotationally move the movement frame in a first direction based on the first support frame;
   a first rotation guide located between the movement frame and the first support frame and having a first arc shape, wherein the movement frame rotates in the first direction; and
   a first ball inside the first rotation guide,
   wherein a center of curvature of the first rotation guide coincides with a center of rotation of the reflector,
   wherein the first support frame includes a second magnet provided on a lower surface of the first support frame.

2. The actuator of claim 1, further comprising:
   a second support frame configured to provide a second space for the first support frame to move;
   a second drive coil configured to generate a second electromagnetic force in the second magnet to rotationally move the first support frame in a second direction opposite to the first direction based on the second support frame;
   a second rotation guide located between the first support frame and the second support frame and having a second arc shape, wherein the first support frame rotates in the second direction; and
   a second ball inside the second rotation guide,
   wherein a center of curvature of the second rotation guide corresponds to the center of rotation of the reflector.

3. The actuator of claim 2, wherein the second rotation guide comprises:
   a first guide rail provided on an outer surface of the first support frame perpendicular to an optical axis; and
   a second guide rail provided on an inner surface of the second support frame to correspond to the first guide rail.

4. The actuator of claim 2, wherein the second rotation guide comprises:
   a guide rail provided on an outer surface of the first support frame perpendicular to an optical axis; and
   a holder provided on an inner surface of the second support frame to correspond to the guide rail.

5. The actuator of claim 4, wherein the holder is one of a plurality of holders disposed along the second arc shape.

6. The actuator of claim 2, wherein the second rotation guide comprises:
   a guide rail provided on an inner surface of the second support frame perpendicular to an optical axis; and
   a holder provided on an outer surface of the first support frame to correspond to the guide rail.

7. The actuator of claim 6, wherein the holder is one of a plurality of holders disposed along the second arc shape.

8. The actuator of claim 2, wherein the first rotation guide includes a first pair of guide rails based on the center of curvature of the first rotation guide and the second rotation guide includes a second pair of guide rails based on the center of curvature of the second rotation guide.

9. The actuator of claim 2, further comprising a yoke configured to generate an attractive force in the second magnet,
   wherein centers of the second magnet and the yoke correspond to the center of curvature of the second rotation guide.

10. The actuator of claim 2, wherein the second drive coil comprises:
    a first sub-drive coil configured to rotationally move the first support frame in the first direction; and
    a second sub-drive coil configured to rotationally move the first support frame in the second direction.

11. The actuator of claim 10, further comprising a first position sensor and a second position sensor respectively disposed at inner edges of the first sub-drive coil and the second sub-drive coil, wherein each of the third position sensor and the fourth position sensor is disposed at an edge farthest from the center of curvature of the second rotation guide.

12. The actuator of claim 1, wherein the first rotation guide comprises:
    a first guide rail provided on an inner surface of the first support frame parallel to an optical axis; and
    a second guide rail provided on an outer surface of the movement frame to correspond to the first guide rail.

13. The actuator of claim 1, wherein the first rotation guide comprises:
    a guide rail provided on an outer surface of the movement frame parallel to an optical axis; and
    a holder provided on an inner surface of the first support frame to correspond to the guide rail.

14. The actuator of claim 13, wherein the holder is one of a plurality of holders disposed along the first arc shape.

15. The actuator of claim 1, wherein the first rotation guide comprises:
- a guide rail provided on an inner surface of the first support frame parallel to an optical axis; and
- a holder provided on an outer surface of the movement frame to correspond to the fourth guide rail.

16. The actuator of claim 15, wherein the holder is one of a plurality of holders disposed along the first arc shape.

17. The actuator of claim 1, further comprising:
- a third magnet in the first support frame; and
- a yoke in the movement frame to generate an attractive force in the third magnet,
- wherein centers of the third magnet and the yoke correspond to the center of curvature of the first rotation guide.

18. The actuator of claim 1, further comprising a first position sensor and a second position sensor disposed at an inner center of the first drive coil.

* * * * *